United States Patent
Das

(10) Patent No.: US 12,321,898 B2
(45) Date of Patent: *Jun. 3, 2025

(54) SYSTEM AND METHOD FOR GENERATING SKILL-CENTRIC ONLINE RESUMES WITH VERIFIABLE SKILLS

(71) Applicant: Debaleena Das, Los Gatos, CA (US)

(72) Inventor: Debaleena Das, Los Gatos, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 17/881,510

(22) Filed: Aug. 4, 2022

(65) Prior Publication Data

US 2022/0383264 A1 Dec. 1, 2022

Related U.S. Application Data

(63) Continuation-in-part of application No. 17/558,427, filed on Dec. 21, 2021, now abandoned, which is a continuation of application No. 16/393,195, filed on Apr. 24, 2019, now Pat. No. 11,210,637.

(60) Provisional application No. 62/661,708, filed on Apr. 24, 2018.

(51) Int. Cl.
   G06Q 10/00 (2023.01)
   G06F 16/22 (2019.01)
   G06F 16/9535 (2019.01)
   G06Q 10/1053 (2023.01)
   G06Q 50/00 (2012.01)
   H04L 51/52 (2022.01)

(52) U.S. Cl.
   CPC ......... *G06Q 10/1053* (2013.01); *G06F 16/22* (2019.01); *G06F 16/9535* (2019.01); *G06Q 50/01* (2013.01); *H04L 51/52* (2022.05)

(58) Field of Classification Search
   CPC .... G06Q 10/1053; G06Q 50/01; G06F 16/22; G06F 16/9535; H04L 51/52
   See application file for complete search history.

(56) References Cited

U.S. PATENT DOCUMENTS

| | | | |
|---|---|---|---|
| 9,331,973 B1 * | 5/2016 | Kristinsson | G06F 16/35 |
| 2017/0154313 A1 * | 6/2017 | Duerr | G06F 16/24578 |
| 2018/0295207 A1 * | 10/2018 | Mathur | G06F 16/9535 |

OTHER PUBLICATIONS

Endorsement Deduction and Ranking in Social Networks Hebert Perez-Roses, Francesc Sebe, Josep Maria Ribo. Aug. 20, 2018 (https://arxiv.org/pdf/1510.01997.pdf) (Year: 2018) Note: This reference was provided in the Non-Final Office Action (Apr. 19, 2021) in U.S. Appl. No. 16/393,195 (now U.S. Pat. No. 11,210,637).*

* cited by examiner

*Primary Examiner* — Gabrielle A McCormick
(74) *Attorney, Agent, or Firm* — Stuart J. West; Theodore A. Marsh

(57) ABSTRACT

Systems and methods that can provide verifications and grades corresponding to items represented within ecommerce platforms such as online resume generation, online product marketplace, and online social media platforms. Evaluations of items such as skills, products, users, topics, and characteristics of users and items, contribute to verifications and grades that can be displayed in a user-friendly and understandable manner, employing graphic indicators. Contributions to the verifications and grades can be weighted according to grader profiles and item classification.

24 Claims, 30 Drawing Sheets

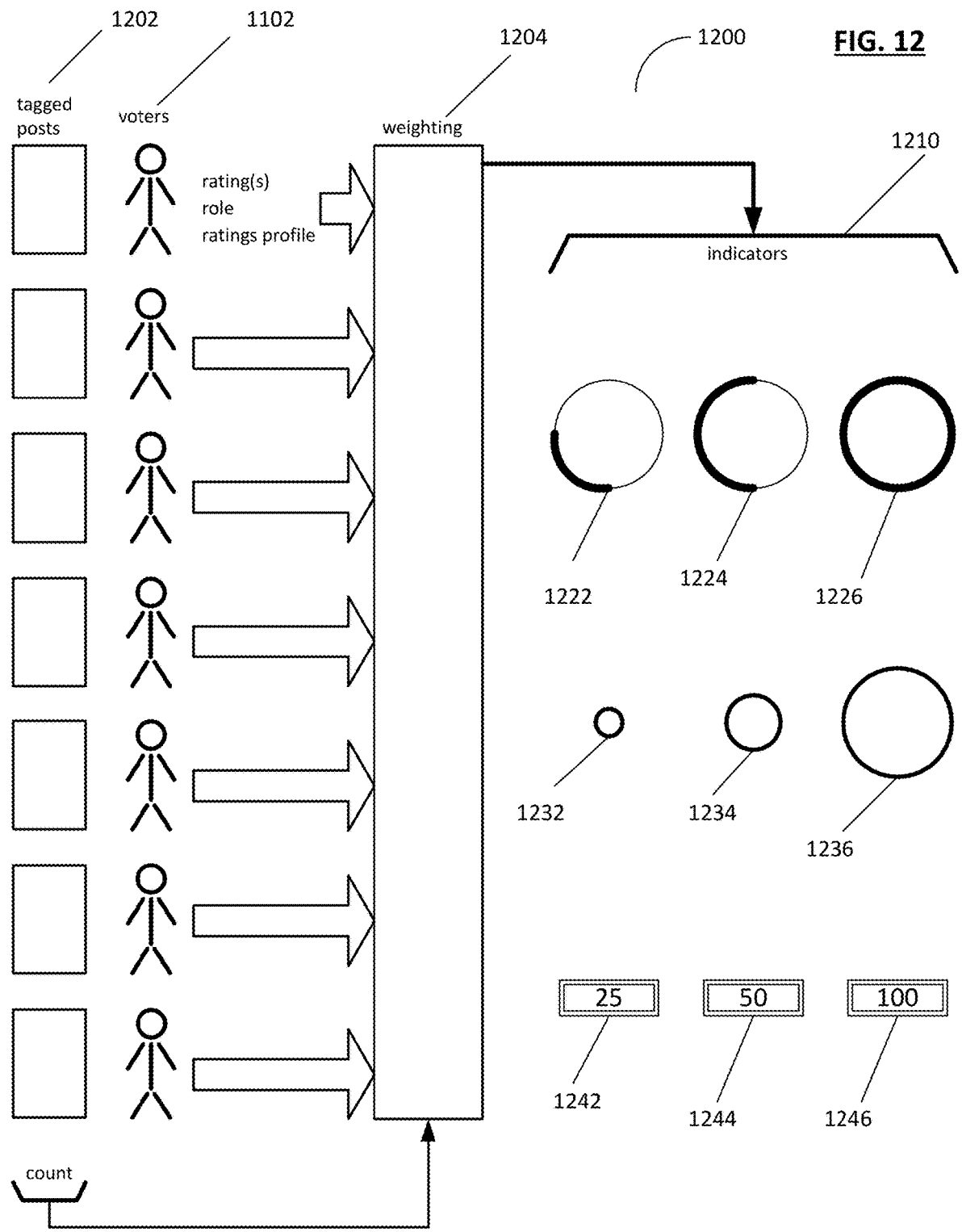

FIG. 15

SYSTEM AND METHOD FOR GENERATING SKILL-CENTRIC ONLINE RESUMES WITH VERIFIABLE SKILLS

CLAIM OF PRIORITY

This application is a continuation-in-part of prior-filed and co-pending U.S. Non-Provisional patent application Ser. No. 17/558,427, filed Dec. 21, 2021, entitled, System and Method for Generating Skill-Centric Online Resumes with Verifiable Skills, which is a continuation of prior-filed U.S. Non-Provisional patent application Ser. No. 16/393,195, filed Apr. 24, 2019, now U.S. Pat. No. 11,210,637, issued Dec. 28, 2021, entitled, System and Method for Generating Skill-Centric Online Resumes with Verifiable Skills, which claims the benefit of priority under 35 U.S.C. § 119(e) to U.S. Provisional Patent Application Ser. No. 62/661,708, filed Apr. 24, 2018, entitled, Method of Generating Skill Centric Online Resumes with Verifiable Skills, the complete contents each of which is hereby incorporated herein by reference.

BACKGROUND

Technical Field

The present disclosure relates generally to a systems and methods of hiring and resume creation and more specifically to a system and method of generating skill centric online resumes with verifiable skills and customized views to assist in hiring.

Background

An online resume can be provided by a computer-based application and/or a web-based application.

Online resume systems are prevalent. However, during the hiring process it is incumbent upon an employer to verify the veracity of the skills and education asserted by the applicant. While verification of education is a relatively simple process that can be verified in a number of simply ways, verification of an applicant's asserted skills are far more complex. Currently employers use a number of techniques to verify an applicant's skill set, such as questioning during the interview process, online or in-person testing and/or contacting references and/or former employers. However, these methods rely generally upon single date points or information only from a single source and even if the single data point or source provides a good reference, generally the employer has no way of testing the veracity of the data point or of the assertion made by a reference. Thus, creating great potential for an applicant to introduce "puffery" into a resume by asserting skills that the applicant may or may not possess and/or an assertion by an applicant of a level of mastery of a skill that the applicant may or may not possess. Therefore, what is needed are systems and methods for an online resume generation service which can provide skill verification of assertions contained within a resume and associated systems and methods to display the information in a user-friendly and understandable manner.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

General aspects of the disclosure comprise: a method including the steps of: incorporating one or more modules into an online ecommerce platform to improve a capability of the online ecommerce platform to provide item verifications and grades corresponding to a ratable structure, the ratable structure stored in database storage of a database of the online ecommerce platform, the one or more modules configuring one or more computer processors of the online ecommerce platform to perform operations, the operations comprising: instantiating the ratable structure corresponding to a first user in the database storage; notating, in the ratable structure, records of one or more specified items corresponding to the first user; storing a message in the database storage as a first evaluation corresponding to the first user, wherein a first online discussion area may include an instance of the message; attaching an item tag to the first evaluation, the item tag corresponding to the first user and a selected one of the specified items; monitoring the first online discussion area for evaluations corresponding to the first user; detecting an evaluation corresponding to the first user that may include the item tag corresponding to the selected one of the specified items, and, linking the detected evaluation with the ratable structure, thus augmenting the ratable structure with a link to the detected evaluation; receiving a query corresponding to the first user and the selected one of the specified items; and, in response to the query, presenting the ratable structure having the link to the detected evaluation, thereby providing at least some item verifications and grades corresponding to the ratable structure. Other embodiments of this aspect comprise corresponding computer systems, apparatus, and computer programs recorded on one or more computer storage devices, each configured to perform the actions of the methods.

Implementations can comprise one or more of the following features: the online ecommerce platform may include an online resume generating service; the online ecommerce platform may include an online marketplace; and, the online ecommerce platform may include an online social media platform. Implementations of the described techniques can comprise hardware, a method or process, or a computer tangible medium.

General aspects of the system can comprise a system configured to perform operations comprising: instantiating in memory a ratable structure corresponding to a first user; identifying a portion of said ratable structure having at least one predefined item contained within said ratable structure; instantiating discussion areas in a database; identifying an evaluation corresponding to said first user in said database; associating said evaluation with said at least one predefined item; associating said evaluation with said portion of said ratable structure having at least one predefined item, such that a viewer of said ratable structure can access said evaluation from said instantiated ratable structure. Other embodiments of this aspect can comprise corresponding computer systems, apparatus, and computer programs recorded on one or more computer storage devices, each configured to perform the actions of the methods.

Implementations can comprise one or more of the following features: monitoring said discussion areas for additional evaluations corresponding to said first user; detecting said additional evaluations corresponding to said first user; identifying said one or more items within said additional evaluations; and associating said additional evaluations corresponding to said one or more items with those portions of said ratable structure of said first user associated with said one or more items; receiving a query corresponding to one of said first user and said one or more predefined items; and in response to said query, presenting said ratable structure of said first user. Features can comprise: instantiating a location tag corresponding to one of the one or more predefined items; in response to said query, presenting said ratable structure of said one of the one or more predefined items; and, where the location of the one of the one or more predefined items within the ratable structure is responsive to the location tag. Implementations of the described techniques can comprise hardware, a method or process, or a computer tangible medium.

BRIEF DESCRIPTION OF THE DRAWINGS

Further details of the present invention are explained with the help of the attached drawings in which:

FIG. 12 depicts a block diagram of an exemplary system for weighting and displaying indicators of veracity associated with a skill.

FIG. 15 depicts an exemplary embodiment of an interface for viewing a forum and/or postings.

DETAILED DESCRIPTION

Systems and methods are described herein for while addressing the challenges described above.

Figure 1:
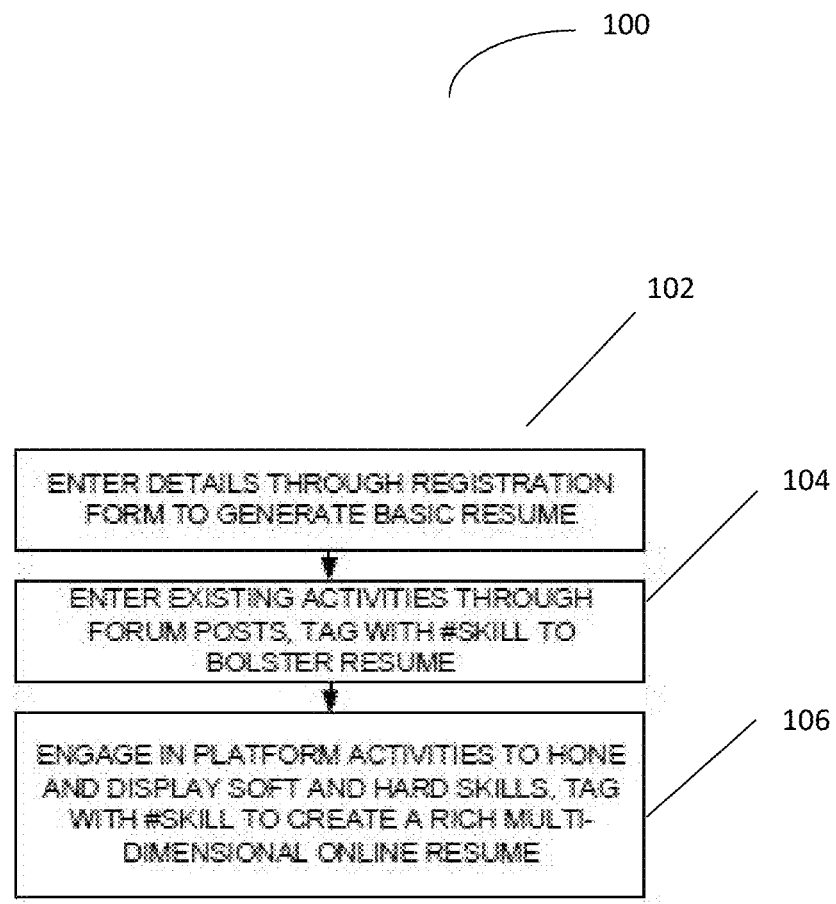
FIG. 1 depicts a high-level block diagram of an embodiment for generating and updating a resume.

Referring now to the drawings wherein like reference characters identify corresponding or similar elements throughout the several views, FIG. 1 a high-level block diagram of an embodiment of a system and method for generating and updating a resume. It should be understood that the embodiments discussed herein are substantially similar in form and function and share one or more of the features discussed in each embodiment although the features may not be shown specifically with reference to the particular embodiment.

Disclosed herein is a system and method to improve hiring by generating skill centric online resumes with verifiable skills and customized views, through an online platform, wherein users can create resumes, and potential employers can browse resumes based on skills. Thus, the system and method can connect job seekers with employers in a structured and efficient manner.

FIG. 1 a high-level block diagram of an embodiment of a system and method for generating and updating a resume 100 in which, personal details/elements can be entered into the system in step 102 via online (or other) portal. In some embodiments, the personal details can include location, name, contact information, education, work experience, academic achievements and/or another know, convenient and/or desired information regarding a user/registrant. The personal details can then be used to create a basic resume for the user/registrant. In step 104, activities for incorporation in the resume can be entered via forum posts and such forum posts can be tagged as skills, with a relevant skill tag such as #"skill", which can provide support for details/elements of a user's/registrant's resume. In addition, in some embodiments, in step 106, a user/registrant can engage in (new or existing) activities (such as online activities within a prescribed forum and/or other activities, such as posting or participation on $3^{rd}$ party forums and/or platforms) to hone and demonstrate soft and hard skills, and, such activities can be tagged with the relevant identifiers, such as #"skill", to create a rich, multi-dimensional, verifiable skills set and set of personal details in the user's/registrant's resume. Accordingly, posting activities can enhance a resume and provide support for assertions made in a resume.

Figure 2:
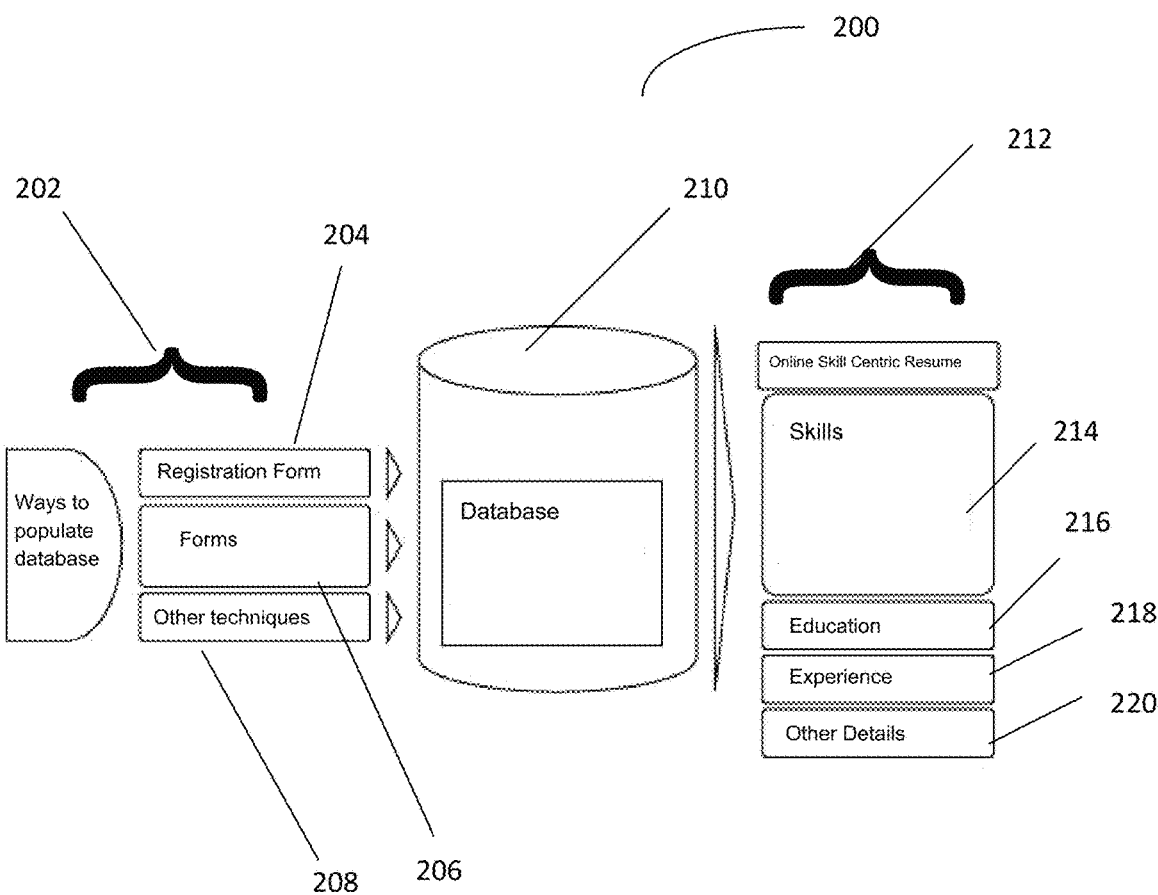
FIG. 2 depicts a high-level system diagram an embodiment for generating and updating a resume.

FIG. 2 depicts a high-level system diagram an embodiment for generating and updating a resume 200. As depicted in FIG. 2, a resume can be populated 202 within the system in multiple ways and via multiple avenues, such as, by way of non-limiting example, a user can fill out a registration form 204 with prescribed fields and/or user modifiable fields, wherein personal information as described above can be collected to generate a resume for the user. In some embodiments, a user can access a plurality of forums 206 and enter information or make postings, wherein each forum can be associated with a particular skill or skills. Additionally, in some alternate embodiments, other techniques 208, can be employed to enter resume information and/or update such resume information, such as manual input and/or data retrieval from other/$3^{rd}$ party sources.

The gathered resume data than then be stored in a databased 210 wherein each post made by a user can be tagged with an identifier or identifiers, such as #"skill", and associated with the relevant skill/component of the specific user's resume. Thus, as a user creates more forum posts and partakes in platform activities, their skill level can increase and their skills can be verified, providing employers more confidence in assertions made in a user's/registrant's resume and making them a more valuable candidate for particular hiring opportunities.

The system can allow potential employers to view users'/registrants' resumes through a viewing engine 212 that can be searched and view-customized by a potential employer to rank order (sub-order) users/registrants resumes in any manner desired by the potential employer, such as by skill(s) 214, by education 216, experience 218 and/or other known convenient and/or employer-specified details 220. As depicted in the skills 214 area, in some embodiments, the degree of confidence of the user's/registrant's abilities and/or qualifications related to a particular detail in a resume can be graphically displayed, such as by a circle of increasing size (wherein size of the circle corresponds to the degree of confidence associated with a particular detail). Further, in some embodiments, the system and method can provide customized viewing of resumes based on the audience, such as viewing modes or displays for peers, mentors, managers, human resources, and/or any other known, convenient and/or desired group, which can include the same information (or a limited set of information), but in a format which may be more appropriate for the identified viewer.

Figure 3:
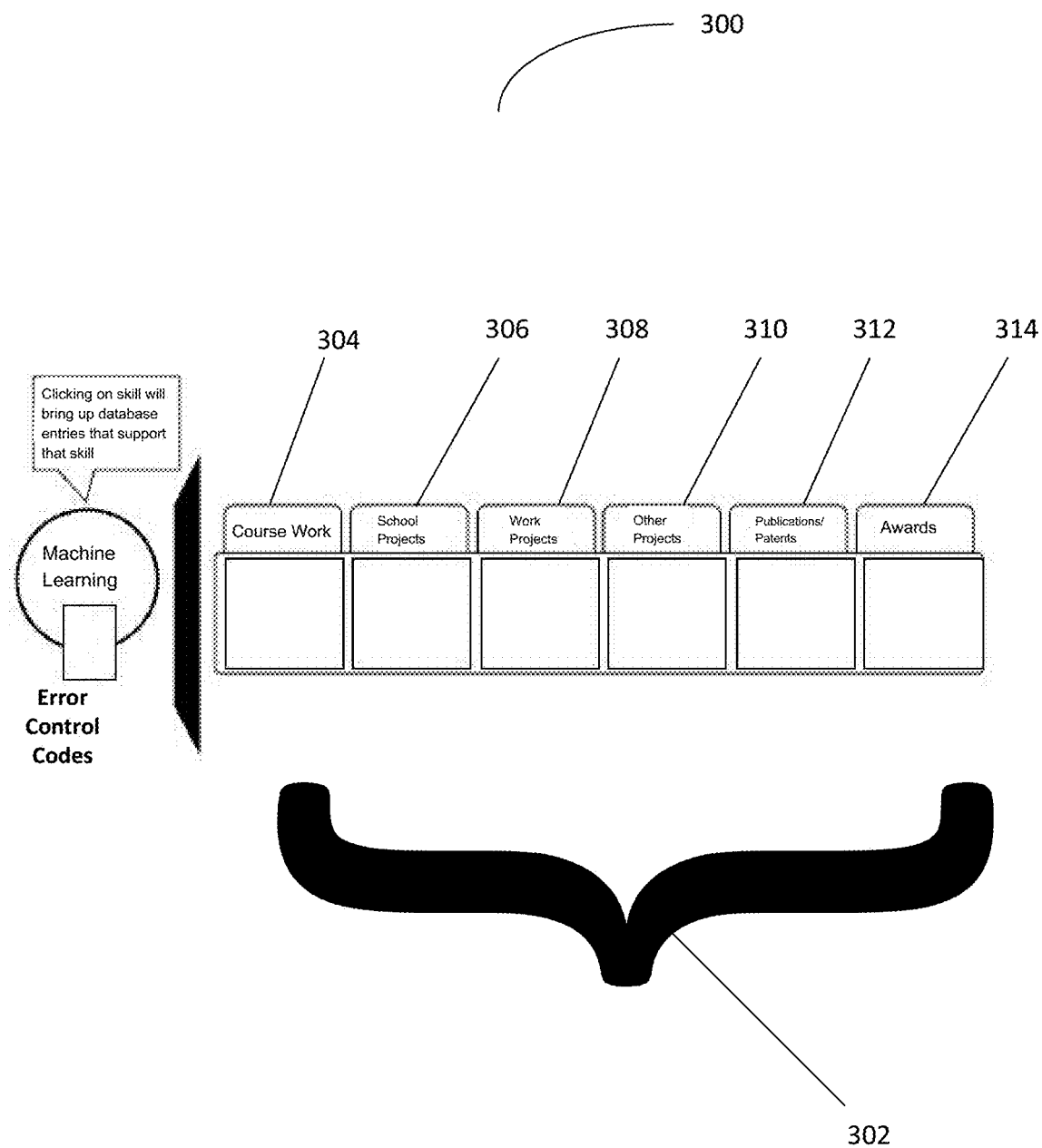
FIG. 3 depicts an embodiment of a user resume.

FIG. 3 depicts an embodiment of a user resume 300. As depicted in FIG. 3, verification of a skill or assertion within a user's/registrant's resume can be performed by dividing the resume 300 into selectable areas 302, such as, by way of non-limiting example course work 304, school projects 306, work projects 308, other projects 310, publications/patents 312, awards 314 and/or any other known, convenient and/or desired area(s). As depicted in FIG. 3, the system allows a potential employer to select an area, such as course work 304, and the system will present all of the user's/registrant's relevant posting/entries related to the user's/registrant's course work so that a user can review the postings/entries. Additionally, in some embodiments, the system and method can comprise a feature allowing the automated matching of job postings on the platform with resumes on the platform, wherein a resume can be identified based upon matching of at least two (or any desired number of) elements via the #"skill" tagging of each resume and a job posting.

Figure 4:
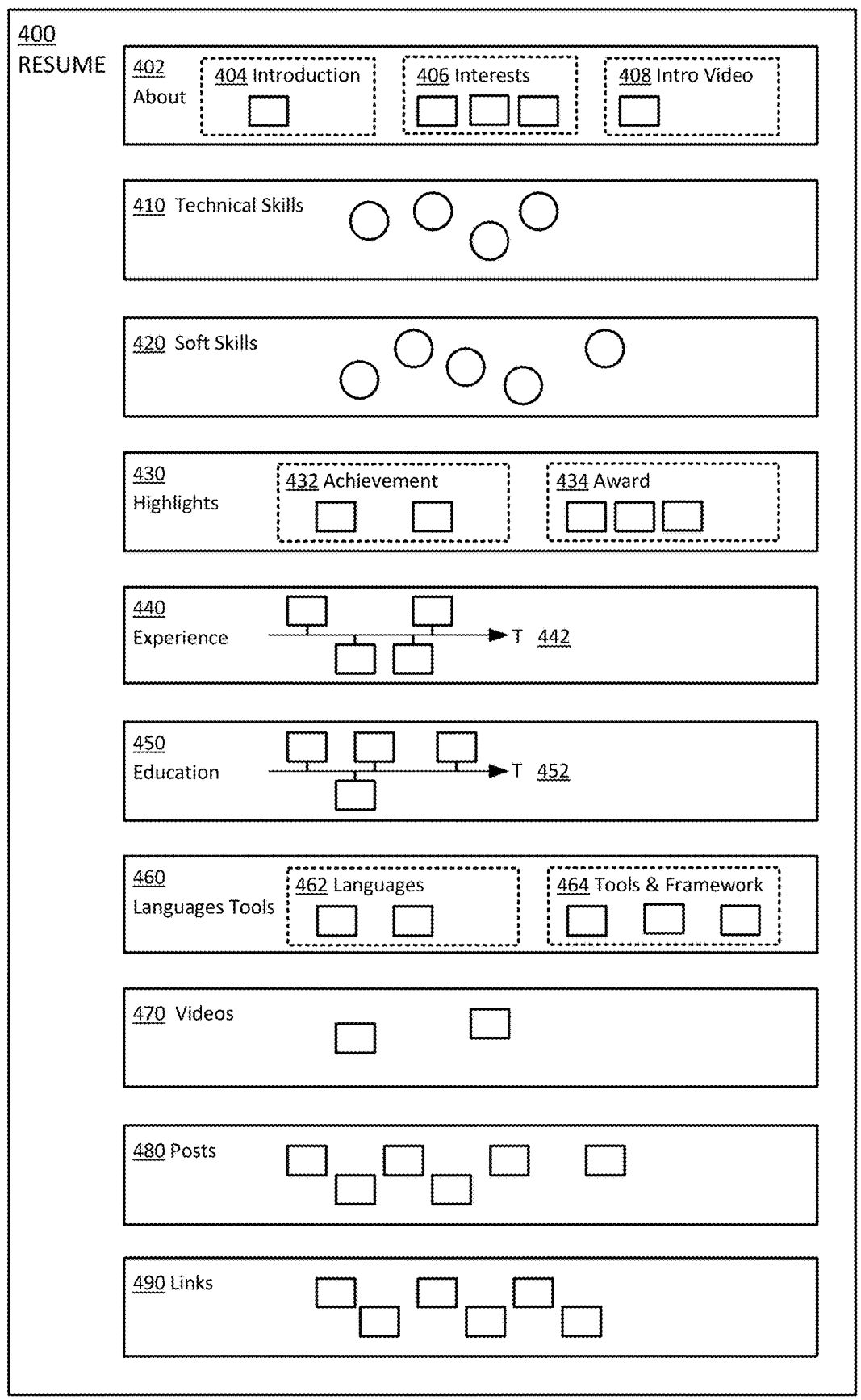
FIG. 4 depicts an exemplary embodiment of an interface for skills verification.

FIG. 4 depicts an exemplary embodiment of an interface for skills verification of a resume 400. As depicted in FIG. 4, in some embodiment the display of a resume within the system can be presented in grouped sections which, in some embodiments can include sections such as, about 402, technical skills 410, soft skills 420, highlights 430, experience 440, education 450, languages/tools 460, videos 470, posts 480 and links 490. FIG. 4 represents only one non-limiting example of the presentation of a resume, in alternate embodiments the resume sections can be grouped in any known, convenient and/or desired configuration. In the embodiment depicted in FIG. 4, the about section 402 can comprise an introduction section 404, an interests section 406 and a introduction video section 408. In operation, when a viewer of the resume selections on the options, such as the interests section 406, the viewer can be directed to page that presents links to various forums and/or posts made by the user/registrant related to the user's/registrant's interests, such as articles and/or forum posts. Similarly, when a view of the resume selects any of the other selectable sections with the about section 402, the viewer can be presented with the associated postings, articles, forums, video and/or any other known, convenient and/or desired perceptible media that is associated with the user/registrant and their identified skill/attribute.

In some embodiments, sections 402, 410, 420, 430, 440, 450, 460, 470, 480, 490 can additionally include graphical representations of the degree of veracity or verification associated with a particular skill of a user/registrant. By way of non-limiting example, in the technical skills section 410, individual skills can be represented as circles of various sizes or colors and/or circles having portions of an arc in a thicker line (or line of different color) wherein the length of the arc in a thicker line and/or the size of the circle is representative of the degree of veracity or verification associated with the given skill. By way of non-limiting example, if the arc of a circle appeared as only having 50% of the circle in a darker, thicker or heavier line and another circle associated with a skill had an arc that was approximately 90% shaded with a darker, thicker or heavier line, then the view would have more confidence in the skill that indicated an approximately 90% verification. Systems and methods associated with verification of the associated skills will be discussed later in reference to other FIGs.

In some embodiments, skills can be grouped with a section, as depicted by the achievements 432 and awards 434 and/or languages 462 and tools and frameworks 464 groupings depicted in FIG. 4. In some embodiments the skills within a group can be directly accessible via link. However, in alternate embodiments, a user can click on a group and be presented with a series of links associated with specific skills within a group.

Additionally, in some embodiments, where a chronological or timeline presentation of information might be useful, relevant skill information can be presented on a timeline and/or in chronological order with individual skills shown along the timelines 442 452 as depicted in associated with the experience 440 and education 450 sections of FIG. 4. However, in some embodiments, skills can be presented in reverse chronological order. By way of non-limiting example, for education, it is common that the most recently received (or highest achievement) degree is shown first and/or furthest to the left and lesser degrees are shown below or to the right. Additionally, not all languages are read left-to-right. Thus, in some embodiments, appearance and ordering of skills can be customized to conform with alternate reading patterns such as right-to-left or top-to-bottom and relevant information can be translated into the associated and/or desired language(s).

Figure 5:
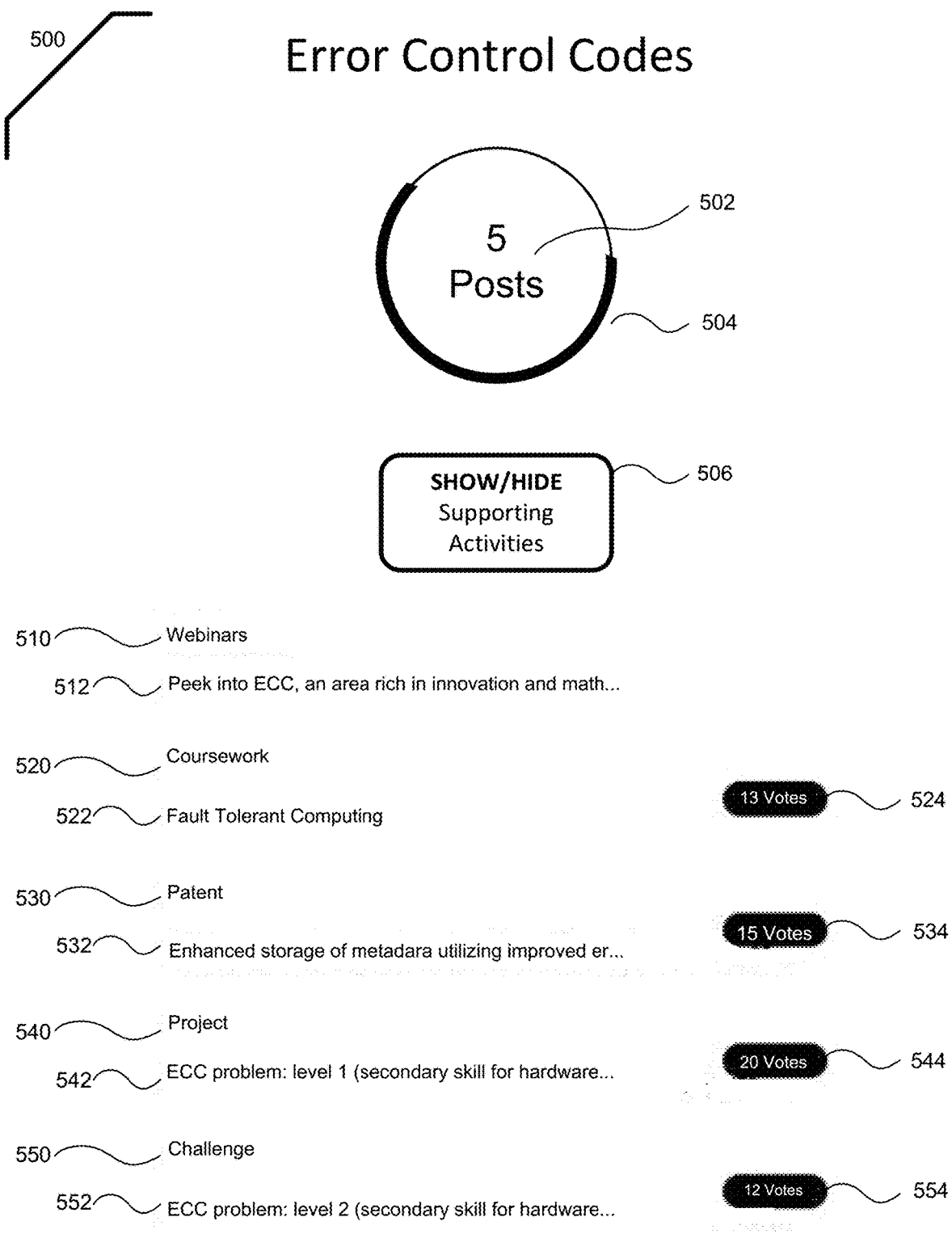
FIG. 5 depicts detailed exemplary embodiment of an interface for skill verification.

FIG. 5 depicts detailed exemplary embodiment of an interface for skill verification 500, that can be presented to a viewer by clicking on, for example, 'Technical Skills' in the resume shown in FIG. 4. In the embodiment depicted in FIG. 5, upon clicking on a given skill, a viewer can be directed to a link that contains a graphical representation 502 of the veracity/verification of the skill 502. In the embodiment depicted in FIG. 5, the graphical representation 502 can provide the user with information such as the number of postings made by the user that are associated with the relevant skill and a circle that is, by way of non-limiting example, shows a thicker arc 504 covering approximately ⅔ of the circle indicating approximately a 66% verification of the skill. However, in alternate embodiments, as previously described, this can be accomplished using a circle that has a diameter proportional to the degree of verification, or a circle having a fixed or variable size and being filled in to a degree related to the degree of verification and/or a circle having a fixed or variable size of a specific color—by way of non-limiting example, if a skill is considered verified, the circle may be green, but if the skill is not considered verified the circle may appear orange, yellow or red indicating reduced levels of confidence in the skill.

Additionally, in some embodiments, an option 506 to display or suppress the associated activities that have been used to support the verification of the skill. If the option 506 is set to display the associated posts/activities that support the verification of the skill, then the associated skills can be presented also along with basic information associated with the verification of the skills. By way of non-limiting example, in the embodiment depicted in FIG. 5, associated posting related to a skill can be webinars 510, coursework, 520, patent(s) 530, project(s) 540, challenge(s) 550 and/or any other known, convenient, desires and/or related tag that is related to the relevant skill verification 500. In the embodiment depicted in FIG. 5, each area can include links to the relevant postings or forums 512, 522, 532, 542, 552 in which the information can be directly found and/or information related to a vote count 524, 534, 544, 554 for the relevant postings or forums that show how others have evaluated the postings and/or whether others have found the posting helpful and/or accurate. In some embodiments, this can be a 1 to 1 counting system wherein the votes of all individuals evaluating a posting of a user/registration can be equally weighted. However, in alternate embodiments, this can be a weighted indication of the count of votes wherein the individual evaluators of the postings are assigned weights based upon the degree of accuracy of veracity that is to be associated with their review of a posting.

Figure 6:
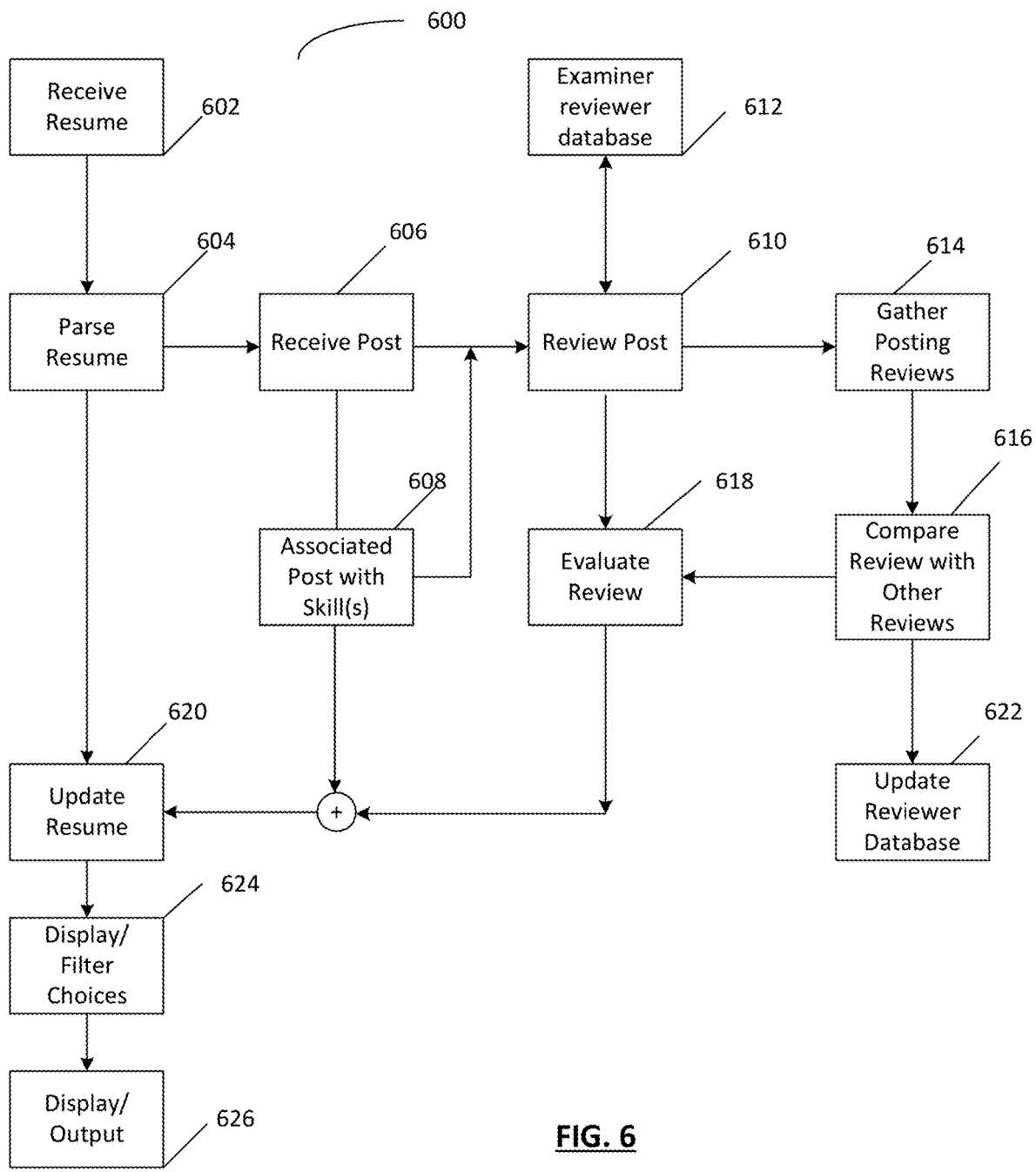
FIG. 6 depicts a block diagram of a system and method for generating and updating a resume with skills verification.

FIG. 6 depicts a block flow diagram of a system and method for skills verification, resume updating, filtering and display of a resume. In step 602, resume information is received and then parsed 604 to categorize various skills/elements of the resume into associated skills. Postings associated with a user/registrant can then be accessed in step 606 and similarly categorized in step 608. In some embodiments the categorization of the resume elements and postings can be manually categorized and associated with one or more skills. However, in alternate embodiments, the resume elements and postings can be categorized and associated with one or more skills in an automated manner using key words and/or phrases and/or any other known, convenient and/or desired technique. In some embodiments, a user/registrant can modify categorization as desired and/or add additional categorization to associate a posting with additional and/or different skills. In some embodiments the categories can be broad groupings or broad technical fields which can comprise sub-categories of more specific skills within a broader high-level category of skills. Such categories and sub-categories can be identified from a pre-defined system set of categories and/or sub-categories which can be modified from time to time. However, in alternate embodiments, such categories and/or sub-categories can be user updated or user generated. In still further alternate embodiments, such categories and sub-categories can be a user modifiable pre-defined set of categories and/or sub-categories. The categories and sub-categories can comprise any known, convenient and/or desired identifications.

In step 610 a post can receive a review and, in some embodiments, an associated rating from viewers of the post. Then in step 612 a reviewer database can be accessed to determine a rating associated with a reviewer. Ratings of reviewers can be based upon any known, convenient and/or desired criteria, such as veracity/accuracy of previous reviews, academic standing, degree of familiarity with subject area of the posting and/or any other known, convenient and/or desired criteria. In some embodiments, certain posting reviewers, such as university professors or verified former employers (and/or any other known, convenient and/or desired reviewer type), can be assigned a perfect or 100% veracity/accuracy rating. However, in alternate embodiments, a reviewer can be assigned a veracity/accuracy rating based upon degree of agreement with other reviewers' evaluations as evaluated in steps 614 and 616. In step 614 evaluations of the posting can be gathered and then in step 616 the current evaluation of the posting by the reviewer can be compared to the average (or any other combination of previous evaluations of the posting) and the degree of veracity/accuracy of the current reviewer, based on agreement with the average of previous reviews (or any other combination of previous evaluations of the posting) can be determined. Based on the degree of veracity/accuracy of the current review, a weight associated with the reviewer can be increased and/or decreased and a database associated with the reviewers can be updated in step 622. The review by the reviewer can then be combined with the reviewer's weighting and the review associated with posting can be evaluated in step 618 and combined with the skills tags and posting from steps 608 and used to update the resume of the user/registrant in step 620. Then in step 624 a viewer of the system can apply filter choices as desired and users'/registrants' resumes can be displayed as desired.

By way of non-limiting example, if a user makes a posting and a reviewer evaluates that user's posting as having an accuracy/veracity of 5 (on a scale of 1-5), but others have evaluated the user's posting as having an accuracy/veracity of 2 (on a scale of 1-5) the reviewer's weight will decrease toward zero, as the reviewers evaluation of the user's post is not calibrated with the opinions of other reviewers. Similarly, if a user makes a posting and a reviewer evaluates that user's posting as having an accuracy/veracity of 4 (on a scale of 1-5), and 90% of others have evaluated the user's posting similarly as having an accuracy/veracity of 4 (on a scale of 1-5) the reviewer's weight will increase toward the maximum weighting possible, as the reviewers evaluation of the user's post is calibrated with the opinions of other reviewers. As noted, some reviewer weights can be fixed and/or can be fixed for particular skills, but not for all skills. By way of non-limiting example, if a user makes a posting and a professor-reviewer evaluates that user's posting as having an accuracy/veracity of 2 (on a scale of 1-5), but others have evaluated the user's posting as having an accuracy/veracity of 5 (on a scale of 1-5) the professor-reviewer's weight will remain the same, as the professor-reviewers weighting is fixed. In yet still further embodiments, if a user makes a posting and a professor-reviewer evaluates that user's posting as having an accuracy/veracity of 1 (on a scale of 1-5), but others have evaluated the user's posting as having an accuracy/veracity of 5 (on a scale of 1-5) the other nonprofessor-reviewer's weights can be decrease toward zero, as the reviewers evaluation of the user's post is not calibrated with the professor-reviewer's evaluation. It should be noted that the 1-5 scale is arbitrary in the above-provided non-limiting examples, and any known, convenient and/or desired metric can be employed.

Figure 7:
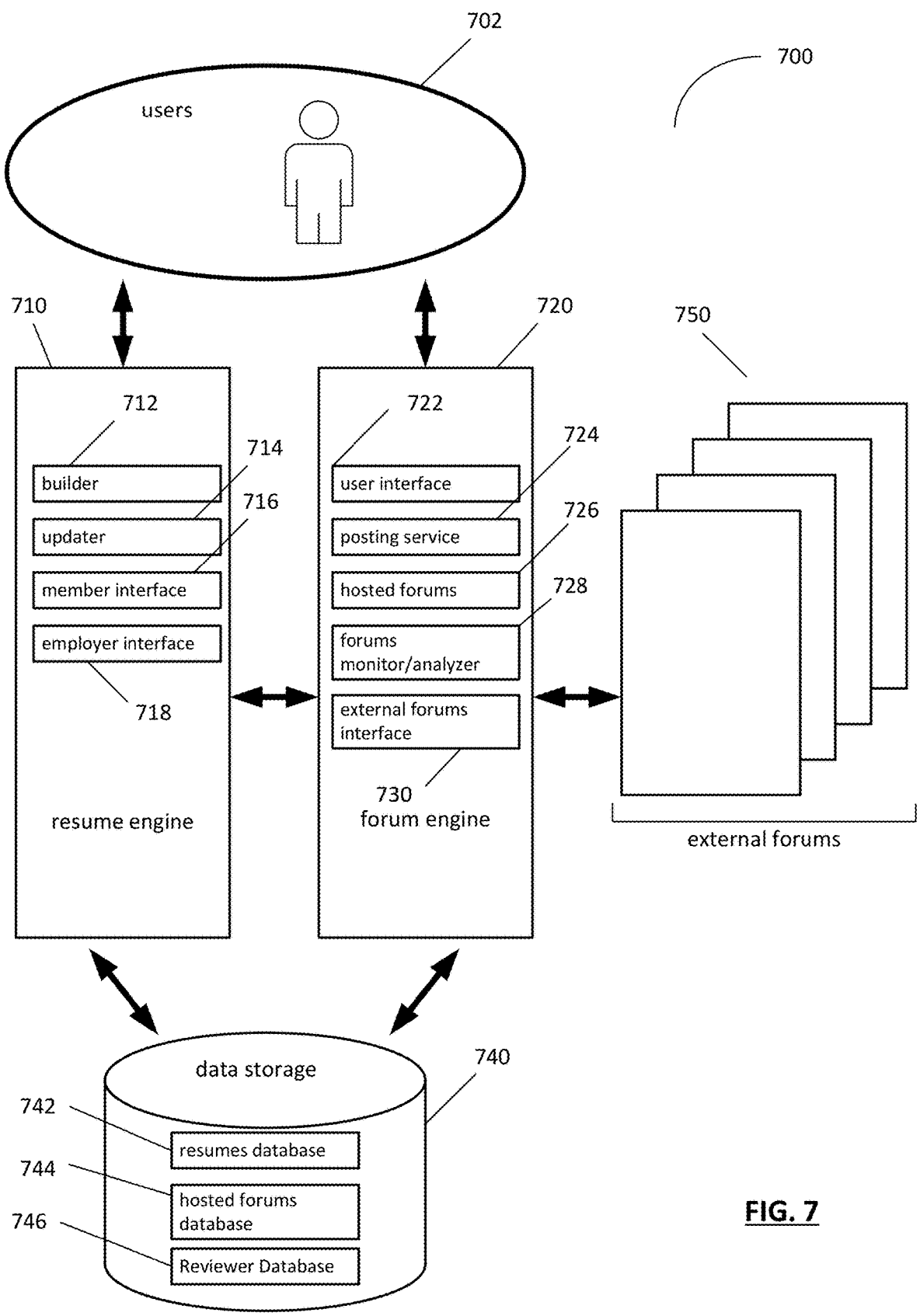
FIG. 7 depicts an exemplary embodiment of a system for generating and updating a resume.

FIG. 7 depicts a block diagram of a system and method for generating and updating a resume with skills verification 700. The embodiment depicted in FIG. 7 of the system and method for generating and updating a resume with skills verification 700 can comprise a plurality of users 702, a resume engine 710, a forum engine 720, a data storage 740 and, in some embodiments, external forums 750. In the embodiment depicted in FIG. 7, the resume engine 710 can comprise a resume builder element 712 that can be used to solicit and/or obtain information about users 702 and/or a user's skills, a resume updater element 714 that can be used to update information about a user and/or a user's skills, a member interface 716 that can allow a user to interact with any one or more components of the system associated with the user's resume and an employer interface 718 that can allow potential employers to access information regarding users' resumes and access related forum information associated with individual user's resumes. Information regarding the user's resume can be stored in the date storage 740.

The forum engine 720 can comprise a user interface 722, a posting interface 724, hosted forums 726, a forums monitor/analyzer 728 and an external forums interface element 730. The user interface can allow users (reviewers, employers and/or user's/registrants) to create unique accounts and manage basic information associated with their accounts, the posting service 724 can allow users/registrants to create and/or categorize postings that can be tied to their resumes in the resume builder and associated data storage 740. The hosted forum 726 can be virtual locations in which users/registrants can post various information regarding topics related to their skills for review by others and a virtual location in which reviewers can review/evaluate the postings of others and/or communicate interactively with other users/registrants, reviewers and/or employers. The forums monitor/analyzer 728 can automatically detect updates to the forums and update a user's/registrant's resume with associated information related to particular skills. In some embodiments, the forum engine 720 can comprise an external forums interface that allows the forum engine to actively access forum sites run by third parties and actively access or scrape information from those external forums for use in updating/verifying a user's/registrant's skills.

Data associated with the users'/registrants' resumes 742 can be stored in the data storage and additional information, such as information related to the forums 744 (internal and/or external) and/or the database of reviewer's weightings 746 can be stored in the data storage.

In operation, a user/registrant 702 can enter resume information into the resume engine 710 and the resume information can be categorized into relevant skills. A user/registrant can then post to forums (internal or external) and the postings can be evaluated by others. The postings can further be categorized into the relevant skills and used to enhance the information contained in a user's/registrant's resume. An employer can then access the resume engine and sort potential candidates using any known, convenient and/or desired mechanism and then access the verification information associated with identified skills which is delivered to the potential employer from the forum engine 720 and/or the data storage 740.

Figure 8:
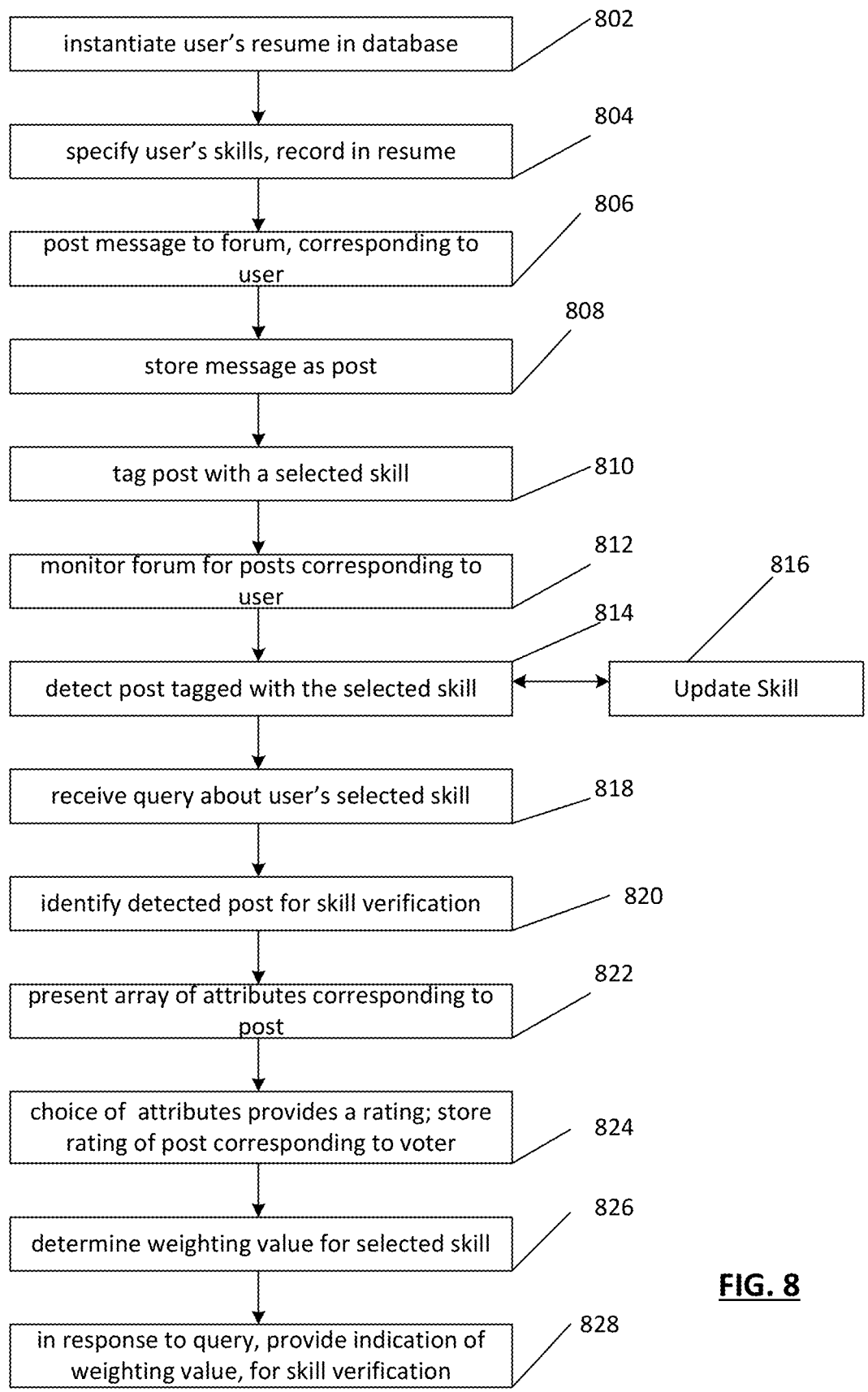
FIG. 8 depicts a block diagram of an embodiment for skill verification

FIG. 8 depicts an exemplary embodiment of a system for generating and updating a resume 800. In the embodiment depicted in FIG. 8, in step 802 a user's/registrant's resume can be instantiated in a resume database and then in step 804 a user's skills are extracted and categorized from the resume. Postings by the user/registrant are then identified within a forum in step 806, stored in a database associated with the user/registration in step 808 and then tagged/associated 810 with a user's/registrant's identified skills and/or new skills are created for the user, associated with the user/registrant. The system can then monitor 812 the forum(s) for activity corresponding to new posts or existing posts associated with the user/registrant and the user's/registrant's skills and detect 814 any activity associated with the user/registrant in the forum(s) and update a user's skill accordingly 816.

In step 818 if the system receives a request for the user's/registrant's resume, the system can identify 820 all posts related to the user's/registrant's skills and present the resume with the user's/registrant's skills. If in step, a user selects a particular skill within a user's/registrant's resume, the associated skills can be presented in step 822 and associated ratings can also be presented in association with those skills 824 which can include a weighted value associated with such skills 826 and in some embodiments information regarding the weighted value can be presented 828 including the relevant posts and evaluations.

Figure 9:
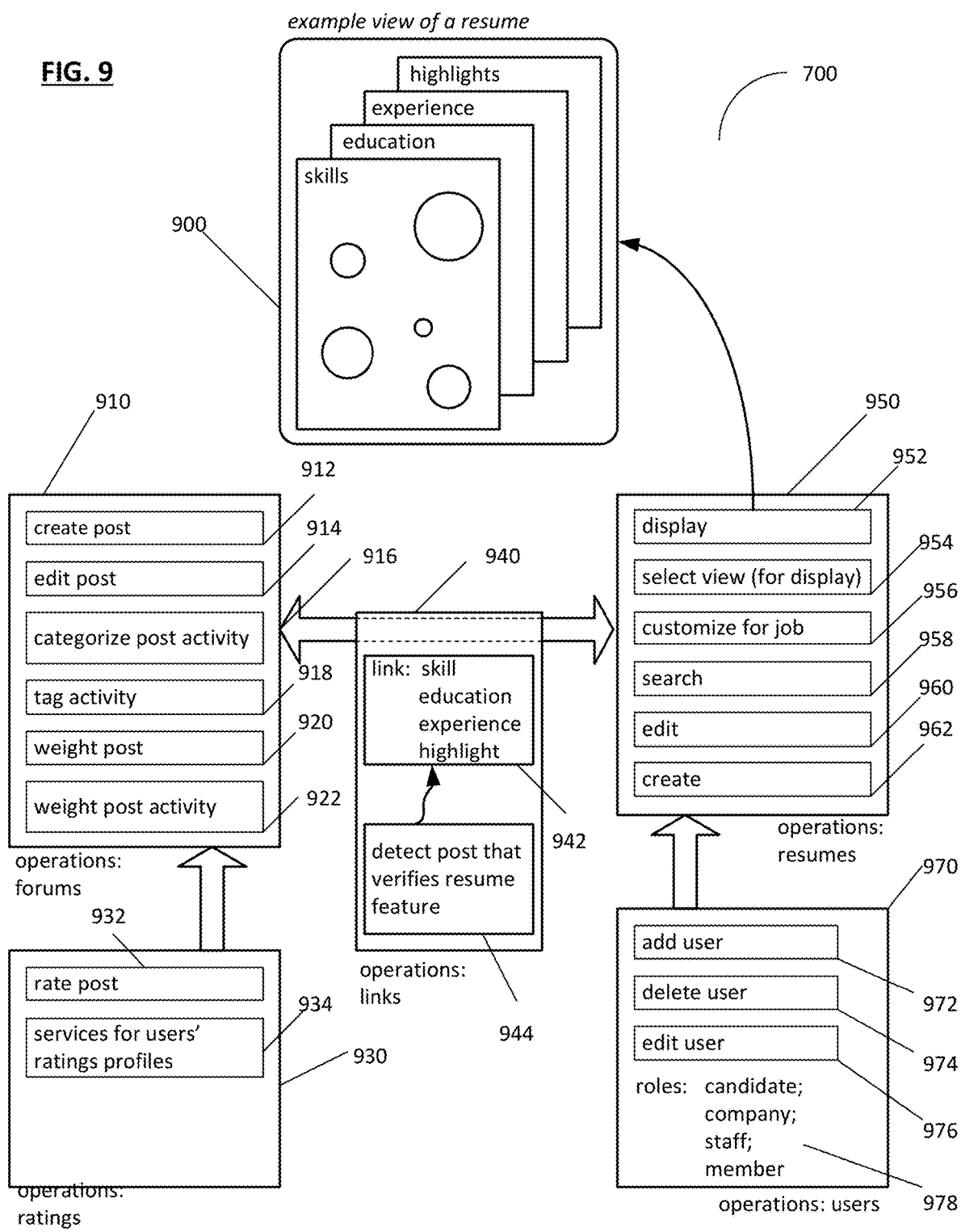
FIG. 9 depicts a block diagram of an embodiment of a system for skill verification.

FIG. 9 depicts a block diagram of an embodiment of a system for skill verification 700. In the embodiment depicted in FIG. 9, the system 700 can be comprised of a forums system 910, a ratings system 930, a linking system 940 a resume generation system 950 and a user's system all configured to interactively deliver a resume 900 with associated verifiable skills.

In operations the forum(s) system 910 allows a user/registrant to create 912 and edit 914 posts which can be categorized 916 and tagged 918 (either manually or automatically or a combination of both) with associated skills for a user. The postings can be weighted appropriately 920 via the ratings system 930. The ratings system 930 can receive ratings 932 related to posts by users/registrants and maintain data related to the quality/weight 934 of a reviewer such that the posting activity 920 can be updated accordingly. Such weighting can be accomplished in accordance with any known, convenient and/or desired weighting system including such systems as described herein. The linking system 940 can be used to detect changes in the forum(s) 944 update skills 942 and link postings in the forum(s) to a user's/registrant's resume 900.

The resumes system 950 can be used to construct a resume 900 for a user/registrant upon demand and in any desired configuration or display order requested. The location for display 952 can be specified, the sequence of items for display can be specified in 954 and/or a customized job-specific query can be constructed to retrieve resumes that meet specified criteria 956. In some embodiments a work, skill or other type of search 958 can be conducted to sift resumes and queries can be edited 960 or created 962 as desired so that resumes can be screened/displayed as desired. The system 700 can comprise the users system 970 that allows the addition 972 of users, deletion 974 of users, editing 976 of users and assignment of user roles 978 to system users.

In operation, a potential employer can register with the users system 970 and then construct a query via the resumes system 950. The resumes system will then gather user information from the user's system related to the resume and the links system 940 will retrieve posts and posting reviews associated with posts and from the forums system 910 and the ratings system 930 and present a resume 900 for a user/registrant that includes the user's/registrant's skills along with links and ratings associated with user's/registrant's asserted skills.

Figure 10:
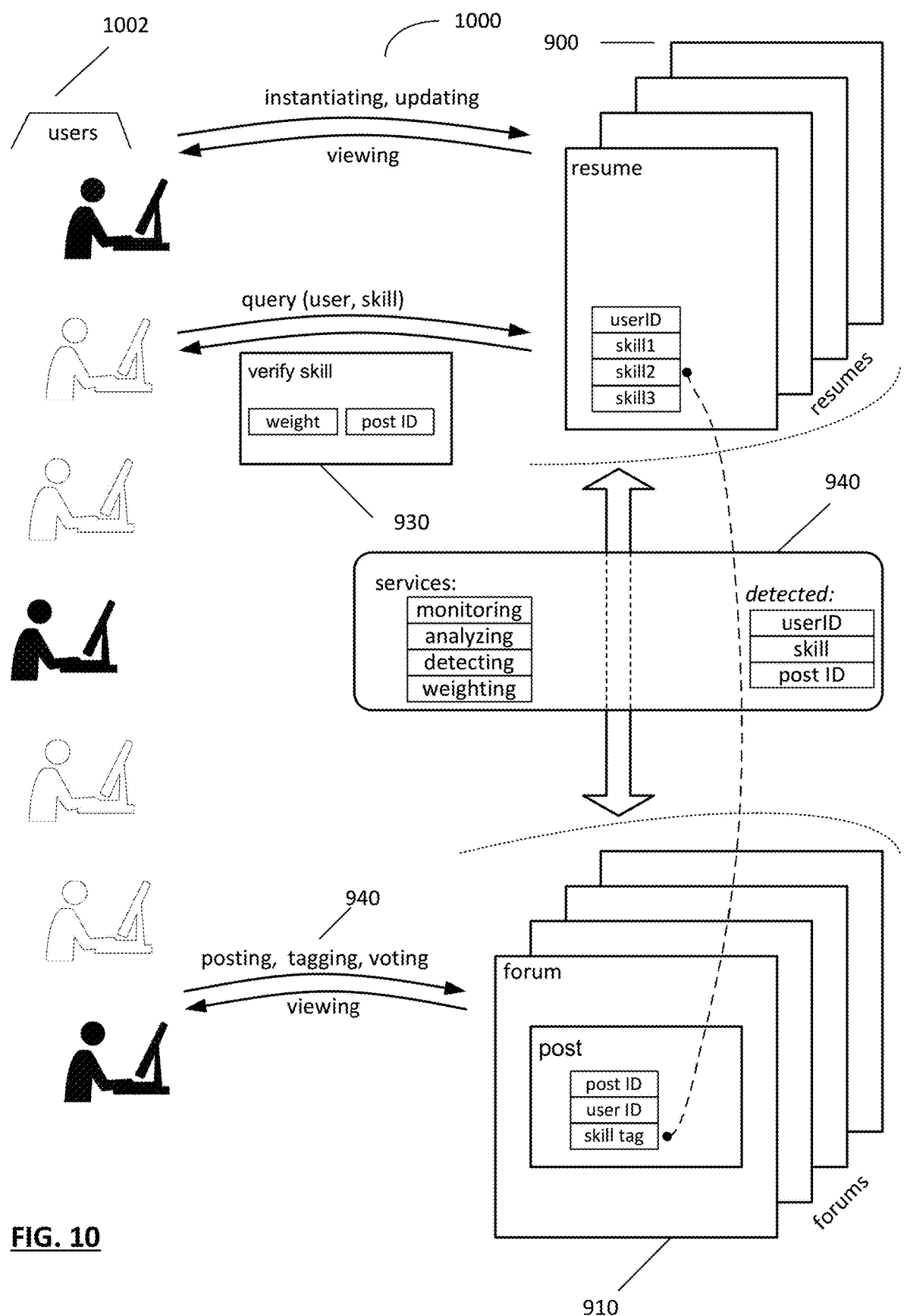
FIG. 10 depicts a block diagram of a system for linking between a forum post and a resume.

FIG. 10 depicts a block diagram of a system for linking between a forum post and a resume 1000. In the embodiment depicted in FIG. 10, the 1002 users (which can include user/registrants, potential employers, reviewers and/or any other known, convenient and/or desired persons or entities) can access the system 1000. User/registrants can create and update their resumes 900 with the system and the resumes can be categorized into skills groups. Such categorization can be performed manually, automatically and/or a combination of manually and automatically. Additionally, users/registrants can post 940 within forum(s) 910 and such postings can be linked to the resumes of the posting user/registrant via the linking system 940. Additionally, within the forums 910, users can rate/evaluate/weight user/registrant postings. The linking system 940 can then combine the postings related to the skills and combine them with the weights of the skills to provide a verification of the user's/registrant's skill asserted in their resume 900. A potential-employer-user can then query the system based on a specific skill or skills and/or any other known, convenient and/or desired query and be presented with one or more user/registrant resumes 900 based upon the query. The presented resume 900 can include the resume information asserted by the user/registrant and the skills categorization along with links to the postings associated with that user's/registrant's skills and, in some embodiments, with associated weights and/or evaluations of the user's/registrant's skills based upon the voting and ranking provided in the forum.

Figure 11:
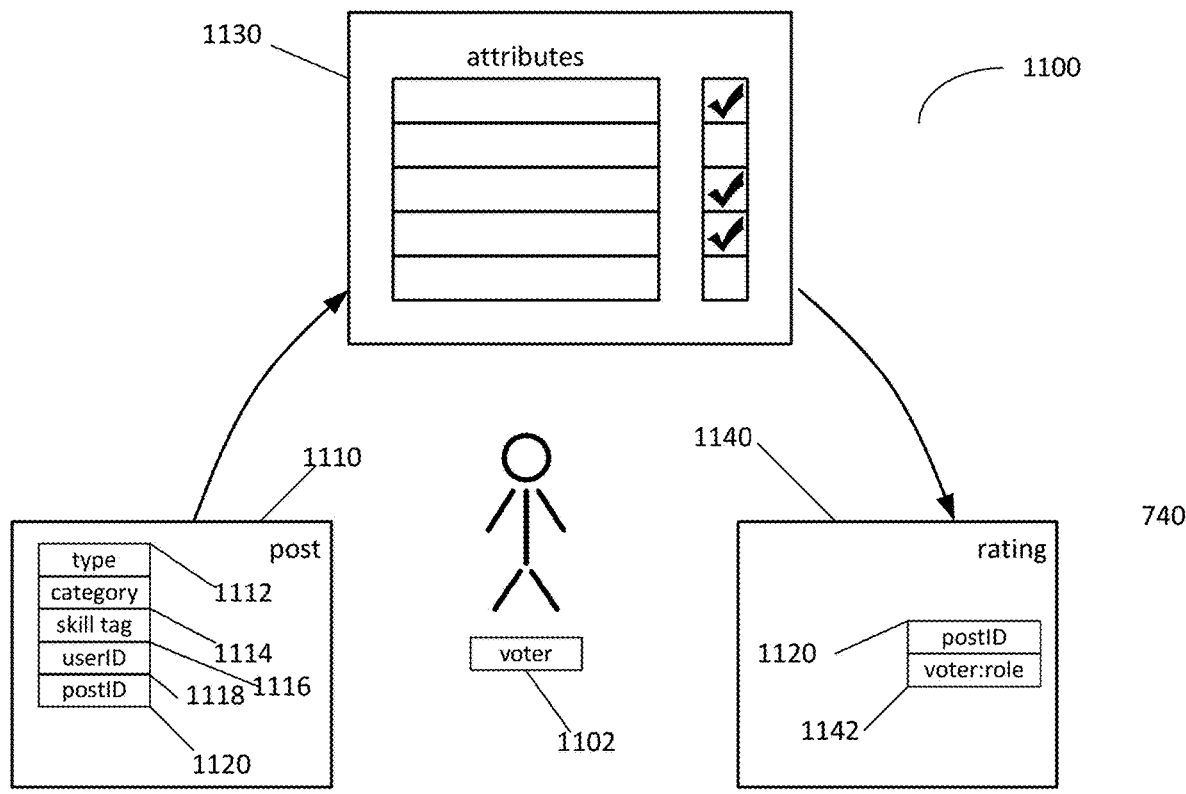
FIG. 11 depicts a block diagram of an exemplary embodiment of a system for rating for a post.

FIG. 11 depicts a block diagram of an exemplary embodiment of a system for rating for a post 1100. In the embodiment depicted in FIG. 11, the system 1100 can comprise a posting system 1110, an attributes linking system 1130 and a rating system 1140. In operation, user/registrants can post in the posting system 1110 and the posting can be categorized to include a type of posting 1112, a category of posting 1114, a skill tag 1116, a user ID 1118 and a posting ID 1120, such that a posting can be associated with a user's/registrant's resume and the particular skills associated with that user's/registrant's resume. A voter 1102 can then evaluate the posting. Attributes 1130 of the posting and the voter 1102 can then be compared to determine a weight that should be associated with a voter's rating. Additionally, the posting ID 1120 and the voter's role connection with the user can be recorded in the rating system 1140. By way of non-limiting example, if the user posts in the forum an article about electrical fields, and the voter were professor of electrical engineering, there would be a high degree of correlation between the subject of the posting and the voter's expertise and thus the weighting of the voter's evaluation would be high. However, if the voter were a professor of French literature, then there would be little correlation between the subject of the posting and the voter's expertise and thus the weighting of the voter's evaluation would be low. Similarly, in some embodiments, the evaluation of a user's/registrant's post by a former employer of the user/registrant can be assigned a specific weight. As previously noted, other systems related to the degree of correlation of a voter's vote with some metric of previous votes can also be used to evaluate and weight the voter's vote.

FIG. 12 depicts a block diagram of an exemplary system for weighting and displaying indicators of veracity associated with a skill 1200. In the embodiment depicted in FIG. 12, tagged posts 1202 can be evaluated by voters 1102 and the voter's rating can be combined with the voter's weight 1204 and then evaluation of a particular skill can be displayed 1210. In some embodiments, the display of the degree of confidence, veracity or verification of the skill can be presented by a circle with a portion of an arc length having a different thickness 1222 1224 1226 whereby circles having longer thickened arc lengths indicate that a skill is more verified. In alternate embodiments, the same information can be presented using the size of a circle 1231 1234 1236 or by a pure numerical value 1242 1244 1246.

Figure 13A:
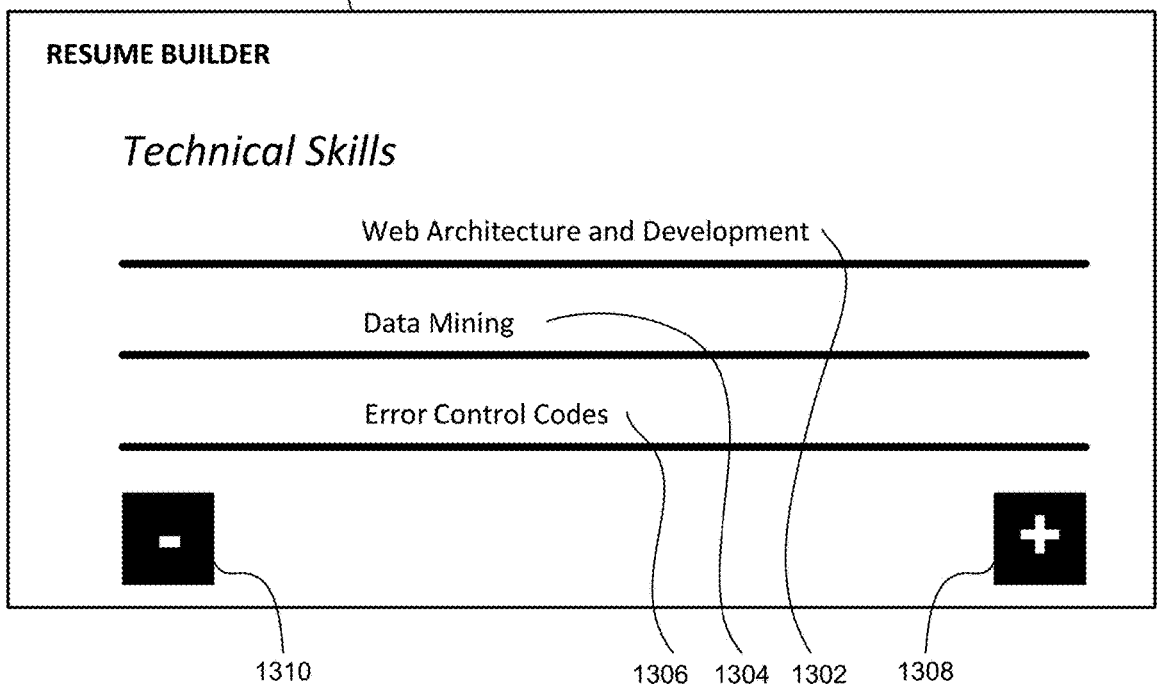
FIG. 13A depicts an exemplary embodiment of a system for adding components to a resume.

FIG. 13A depicts an exemplary embodiment of a system for adding components to a resume 1300. In the embodiment depicted in FIG. 13A, exemplary technical skills 1302 1304 1306 are shown as being added to a resume. A user/registrant can navigate the system by using buttons 1308 1310 to add, remove or edit skills within the user's/registrant's resume. It should be noted with particularity, that while the addition/editing form for skills is presented in a particular format, any known, convenient and/or desired format can be employed.

Figure 13B:
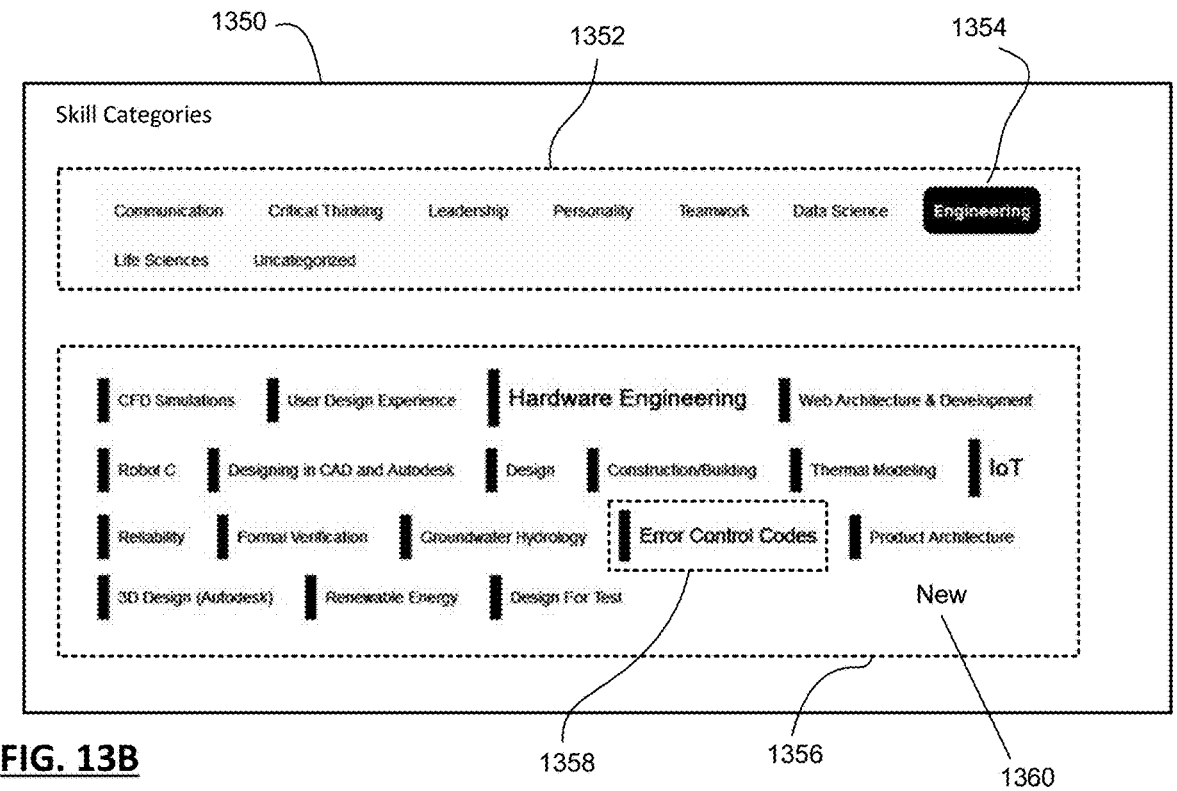
FIG. 13B depicts an exemplary embodiment of a system for categorizing skills contained within a resume and/or categorizing a post.

FIG. 13B depicts an exemplary embodiment of a system for categorizing skills contained within a resume and/or categorizing a post 1350. In the embodiment depicted in FIG. 13B, skills in a posting can be categorized into high-level categories (that group multiple categorizations together) and sub-categories of the high-level categories using selectable options 1352 1356 whereby a user can select a category 1354 and a sub-category 1358 and/or, in some embodiments, enter or propose new options 1360.

Figure 14:
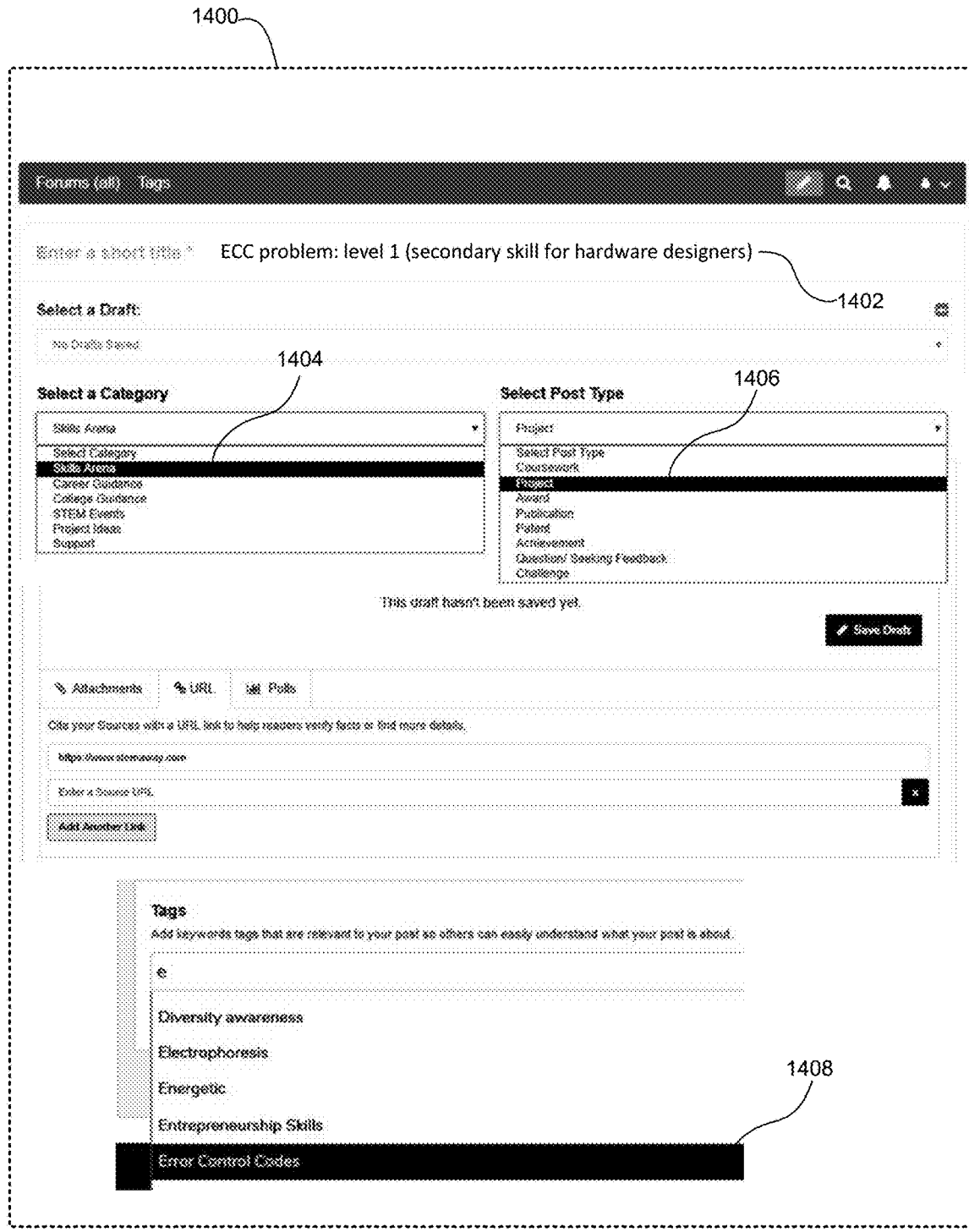
FIG. 14 depicts an exemplary embodiment of an interface for posting to a forum with skill tagging.

FIG. 14 depicts an exemplary embodiment of an interface for posting to a forum with skill tagging 1400. In the embodiment depicted in FIG. 14, a user/registrant can enter a short title 1402 of the post and the provide categorization 1404 and post type 1406, craft the post and then associate the post with tags (pre-populated based on the content of the posting or manually entered by a user and/or both).

Figure 15:
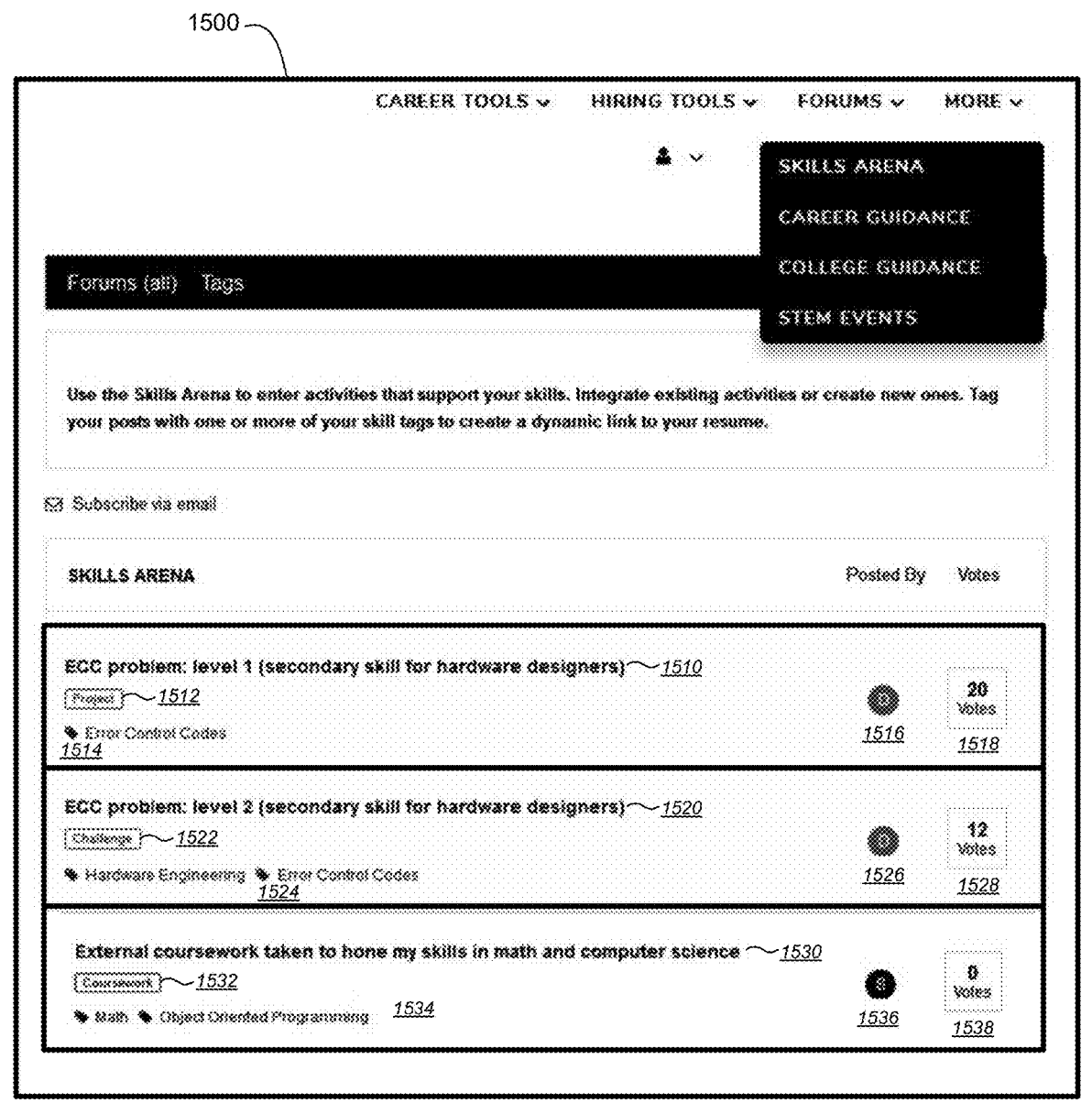

FIG. 15 depicts an exemplary embodiment of an interface for viewing a forum and/or postings 1500. In the embodiment depicted in FIG. 15, postings 1510, 1520, 1530 for particular forum and/or a particular user can be viewed. In the embodiment depicted in FIG. 15, the postings are depicted as also showing categorizations and tags 1512 1514 1522 1524 1532 1534 associated with each posting 1510 1520 1530. Additionally, each posting 1510 1520 1530 can be associated with the poster 1516 1526 1536 and the number of votes 1518 1528 1538 received for each posting. In alternate embodiments, the information can be presented in various ways and/or can be presented with a ranking/weight and/or with less or alternate information, as desired.

Figure 16:
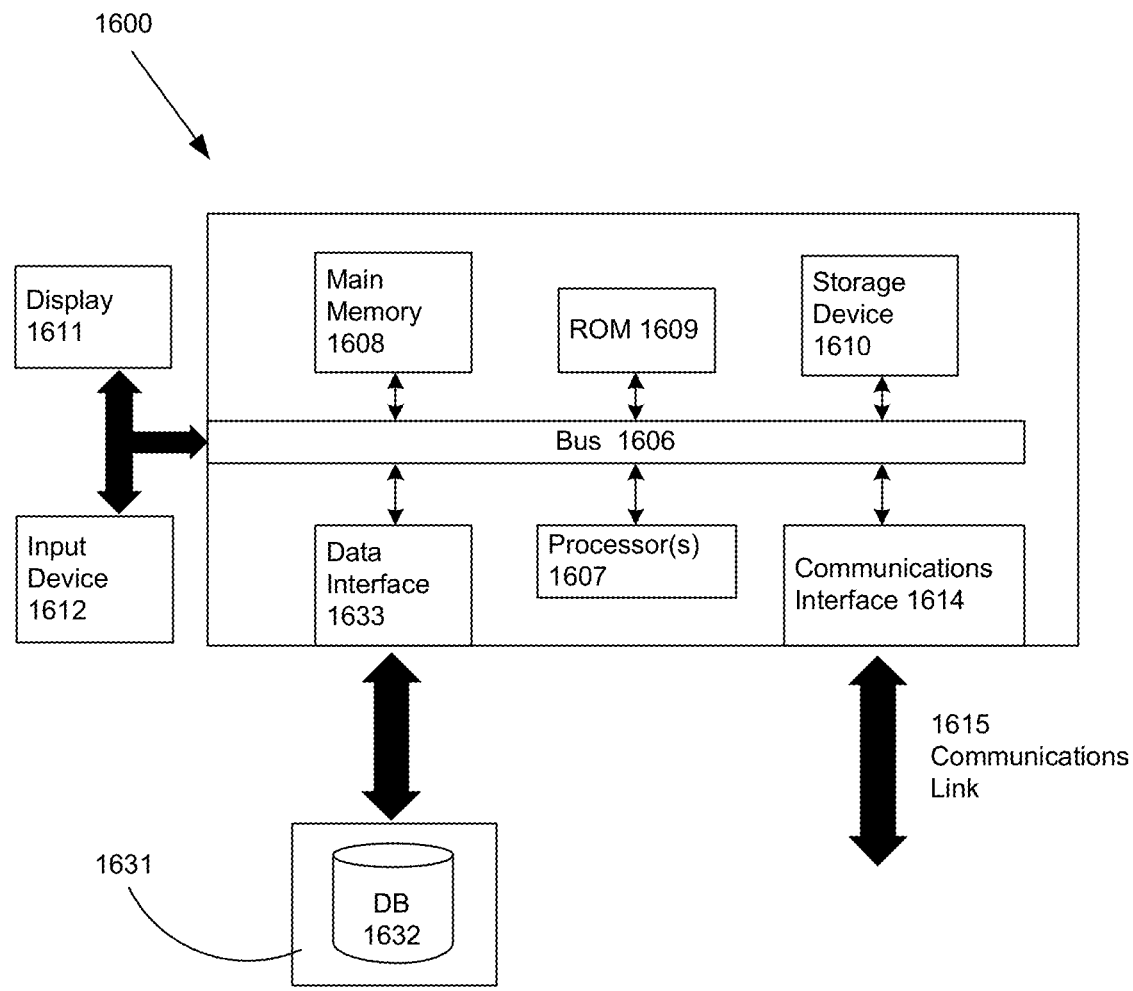
FIG. 16 depicts an exemplary embodiment of a computer system.

The execution of the sequences of instructions required to practice the embodiments can be performed by a computer system 1600 as shown in FIG. 16. In an embodiment, execution of the sequences of instructions is performed by a single computer system 1600. According to other embodiments, two or more computer systems 1600 coupled by a communication link 1615 can perform the sequence of instructions in coordination with one another. Although a description of only one computer system 1600 will be presented below, however, it should be understood that any number of computer systems 1600 can be employed to practice the embodiments.

A computer system 1600 according to an embodiment will now be described with reference to FIG. 16, which is a block diagram of the functional components of a computer system 1600. As used herein, the term computer system 1600 is broadly used to describe any computing device that can store and independently run one or more programs.

Each computer system 1600 can include a communication interface 1614 coupled to the bus 1606. The communication interface 1614 provides two-way communication between computer systems 1600. The communication interface 1614 of a respective computer system 1600 transmits and receives electrical, electromagnetic or optical signals, that include data streams representing various types of signal information, e.g., instructions, messages and data. A communication link 1615 links one computer system 1600 with another computer system 1600. For example, the communication link 1615 can be a LAN, in which case the communication interface 1614 can be a LAN card, or the communication link 1615 can be a PSTN, in which case the communication interface 1614 can be an integrated services digital network (ISDN) card or a modem, or the communication link 1615 can be the Internet, in which case the communication interface 1614 can be a dial-up, cable or wireless modem.

A computer system 1600 can transmit and receive messages, data, and instructions, including program, i.e., application, code, through its respective communication link 1615 and communication interface 1614. Received program code can be executed by the respective processor(s) 1607 as it is received, and/or stored in the storage device 1610, or other associated non-volatile media, for later execution.

In an embodiment, the computer system 1600 operates in conjunction with a data storage system 1631, e.g., a data storage system 1631 that contains a database 1632 that is readily accessible by the computer system 1600. The computer system 1600 communicates with the data storage system 1631 through a data interface 1633. A data interface 1633, which is coupled to the bus 1606, transmits and receives electrical, electromagnetic or optical signals, that include data streams representing various types of signal information, e.g., instructions, messages and data. In embodiments, the functions of the data interface 1633 can be performed by the communication interface 1614.

Computer system 1600 includes a bus 1606 or other communication mechanism for communicating instructions, messages and data, collectively, information, and one or more processors 1607 coupled with the bus 1606 for processing information. Computer system 1600 also includes a main memory 1608, such as a random access memory (RAM) or other dynamic storage device, coupled to the bus 1606 for storing dynamic data and instructions to be executed by the processor(s) 1607. The main memory 1608 also can be used for storing temporary data, i.e., variables, or other intermediate information during execution of instructions by the processor(s) 1607.

The computer system 1600 can further include a read only memory (ROM) 1609 or other static storage device coupled to the bus 1606 for storing static data and instructions for the processor(s) 1607. A storage device 1610, such as a magnetic disk or optical disk, can also be provided and coupled to the bus 1606 for storing data and instructions for the processor(s) 1607.

A computer system 1600 can be coupled via the bus 1606 to a display device 1611, such as, but not limited to, a cathode ray tube (CRT) or a liquid-crystal display (LCD) monitor, for displaying information to a user. An input device 1612, e.g., alphanumeric and other keys, is coupled to the bus 1606 for communicating information and command selections to the processor(s) 1607.

According to one embodiment, an individual computer system 1600 performs specific operations by their respective processor(s) 1607 executing one or more sequences of one or more instructions contained in the main memory 1608. Such instructions can be read into the main memory 1608 from another computer-usable medium, such as the ROM 1609 or the storage device 1610. Execution of the sequences of instructions contained in the main memory 1608 causes the processor(s) 1607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1607. Such a medium can take many forms, including, but not limited to, non-volatile, volatile and transmission media. Non-volatile media, i.e., media that can retain information in the absence of power, includes the ROM 1609, CD ROM, magnetic tape, and magnetic discs. Volatile media, i.e., media that can not retain information in the absence of power, includes the main memory 1608. Transmission media includes coaxial cables, copper wire and fiber optics, including the wires that comprise the bus 1606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Online ecommerce platforms can comprise, by way of non-limiting example, online resume generating services, online marketplaces, and social media platforms. An online resume generating service can comprise resumes. An online marketplace can comprise product listings. A social media platform can comprise social media postings. An online ecommerce platform can comprise a discussion area. In some embodiments, such discussion areas can be known and/or described as forums.

A ratable structure can comprise one or more gradable items. In some embodiments, a ratable structure can itself be a gradable item. A post corresponding to a user can be instantiated in, or as, a ratable structure. In some online resume generating service embodiments, a gradable item of a ratable structure can be a characteristic that is tagged, such as by a skill tag or a location tag, such as in a forum post. In some online marketplace embodiments, a gradable item of a ratable structure such as a product listing can be a product that is identified as a subject of the product listing. In some social media platform embodiments, a gradable item can be a characteristic of a social media posting that is tagged, such as by a topic tag or a tag that characterizes the poster.

A user can evaluate a gradable item, and thus provide an evaluation of the gradable item. Such an evaluation can comprise a review and/or one or more grades. In some embodiments, a grade can comprise a vote.

A user can be described as having one or more specified roles. In some embodiments, a user can be specified and/or described by a corresponding role. By way of non-limiting examples: a user that can provide a vote can be identified and/or described as a voter, and a user that can provide a grade can be identified and/or described as a grader.

Figure 17:
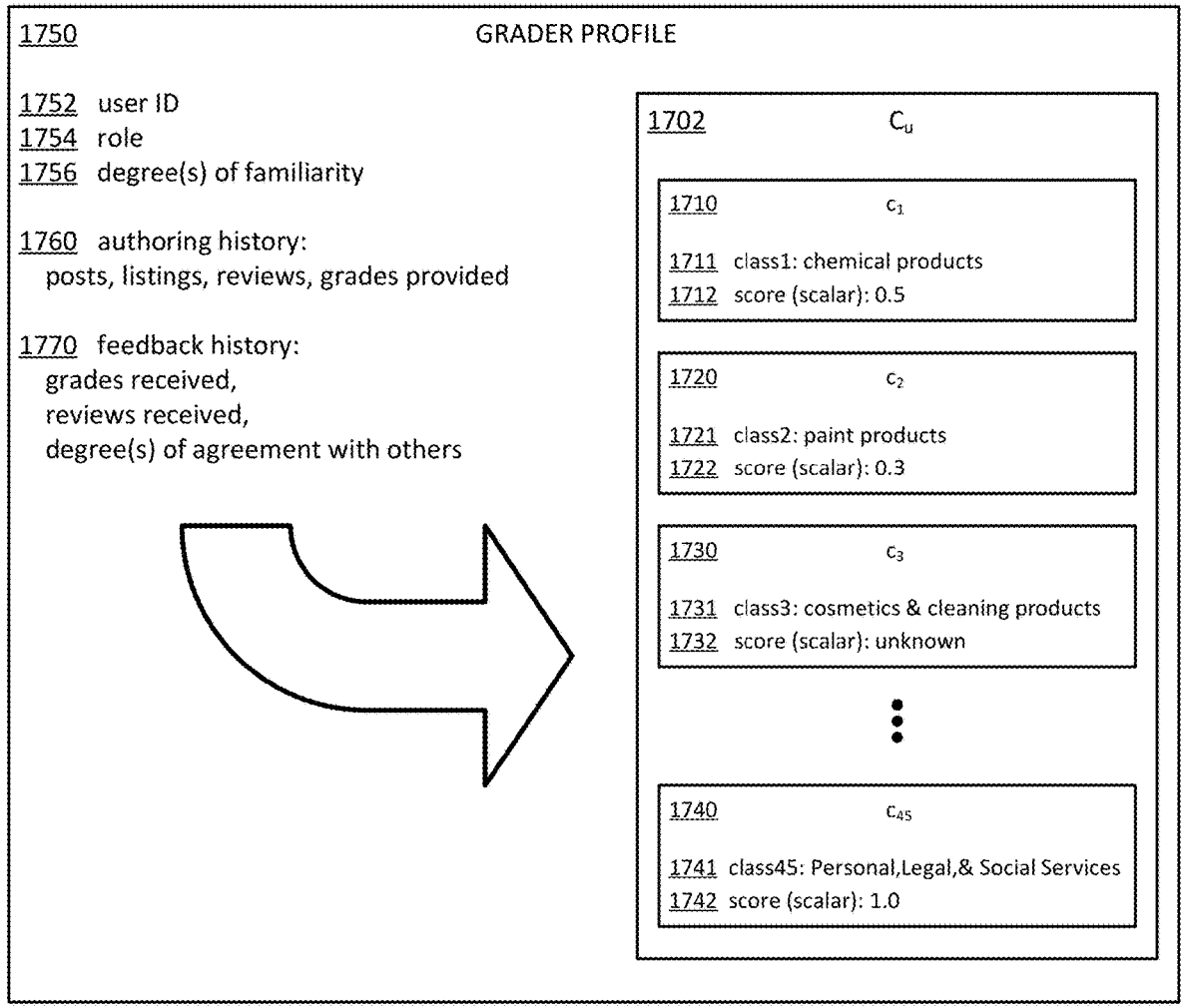
FIG. 17 depicts an exemplary embodiment of a grader profile.

FIG. 17 depicts an exemplary embodiment of a grader profile. A grader profile 1750 can be advantageously utilized in a variety of system embodiments, including the resume-generating service described herein and other e-commerce embodiments such as by way of example and not limitation, social media platforms and online marketplaces. For example, a grader can be a voter in the resume-generating service as described herein. A user profile in an e-commerce system can comprise a grader profile 1750.

A grader profile 1750 can comprise a variety of elements, such as user ID 1752, role 1754, degree(s) of familiarity 1756, authoring history 1760, feedback history 1770, and certitude array 1702. User ID 1752 can correspond to a specific user entity, such as a person. Such an entity can be a grader, that is, an entity that provides and/or receives grades. Role 1754 can comprise identifications and/or descriptions of roles that correspond to the entity identified by User ID. Such roles can comprise, by way of examples and not limitation, administrator, expert, applicant, employer, seller, buyer, subscriber, and/or reader. Degree(s) of familiarity 1756 can provide entries that correspond to the specific user identified in User ID 1752 according to specified subjects. By way of just one example, a teacher of mathematics could have a notation indicating a high degree of familiarity with particular mathematical topics, but can also have a notation indicating little familiarity with automobile repair. Authoring history 1760 can comprise records of the user's posts, listings, reviews provided, grades provided, and/or any other known and/or convenient works of authorship known to the system. Feedback history 1770 can comprise records of the user's grades received, reviews received, and indicators of this user's degree(s) of agreement with other graders with regards to grades provided by this grader. Such other graders and corresponding degree(s) of agreement can be considered individually and/or in groups, and in some embodiments, can be determined with respect to other users/graders identified by role. By way of example and not limitation, feedback history for grades provided by a specific grader can be determined with respect to known 'golden' graders users; such golden graders can essentially set the standard to which grades provided by other graders are compared.

A certitude array 1702 corresponding to a specific grader 1752 can comprise one or more elements 1710, 1720, 1730, 1740, each comprising a measure of certainty corresponding to a specified category or class. That is, an individual grader 1752 can have distinct measures, such as individual scalar scores, for each of a plurality of corresponding categories or classes.

Such classes and/or categories can serve as sort or affiliation indicators for particular topics, goods, and/or services. For example, the United States Patent and Trademark Office (USPTO) employs a classification system comprising 45 classes, also known as International Trademark Classes, to classify (sort) goods and services.

By way of example and not limitation, an embodiment of certitude array 1702 is depicted, utilizing some of the International Trademark Classes. Element 1710 comprises a scalar certitude score 1712 with value 0.5, corresponding to 1711 class/category 'chemical products' that corresponds to the first of the International Trademark Classes.

Similarly, element 1720 comprises a scalar certitude score 1722 value 0.3, corresponding to 1721 class/category 'paint products' that corresponds to the second of the International Trademark Classes.

Similarly, element 1730 comprises a scalar certitude score 1732 value unknown, corresponding to 1731 class/category 'cosmetics & cleaning products' that corresponds to the third of the International Trademark Classes.

Finally, element 1740 comprises scalar certitude score 1742 value 1.0, corresponding to 1741 class/category 'Personal, Legal, & Social Services' that corresponds to the last ($45^{th}$) of the International Trademark Classes.

An embodiment is thus depicted wherein a grader identified by user ID 1752 can have an array of distinct credulity scores for each of several corresponding classes. By way of example, in some embodiments, scalar scores can range from 0 to 1.0, with 1.0 indicating the highest available level of certitude and 0.0 indicating the lowest level. In the certitude array 1702 depicted herein, scores for the identified grader 1752 can thus be interpreted as highest/best/maximum for class/category 'Personal, Legal, & Social Services' and somewhat lower for 1711 'chemical products' and 1720 'paint products.' Embodiments allow for the possibility of unknown scores for specific classes/categories. In some embodiments, such unknown scores can be initialized and/or interpreted to be a pre-determined value, or, a value responsive to other available data. For a specific grader and class/category, such other available data can be, by way of examples and not limitation, the grader's scores from other classes/categories, the grader's scores from other classes/categories that are determined to be in some sense proximate, degree(s) of familiarity 1756 corresponding to the class/category and/or proximate classes/categories, and/or grader role 1754.

In some embodiments, scores can be determined in a variety of ways. Experts and/or authorities can be assigned high values by the system and/or system administrators. There can be a dependency on user/grader role 1754 and/or degree(s) of familiarity 1756. In some embodiments, scores can be automatically generated and/or modified in response to aspects and/or actions of the corresponding user/grader. For example, a grader of goods in an online marketplace can automatically receive a specific score value or improvement of score value if that grader is known by the system to have actually purchased goods within a specific class/category. In some embodiments, the class/category can be limited to a very narrow range of goods or services, such as a specific article of clothing with designated specific characteristics. Thus, the number of distinct classes/categories in some system embodiments can be very large.

Some embodiments can comprise one or more of any known and/or convenient classification schemes, each comprising specific classes and/or categories. Some embodiments can comprise classification by skills, such as those skills specified in embodiments of a resume-generating service described herein. A classification system in Social Media system embodiments can advantageously comprise classes and/or categories corresponding to individuals and/or social groups. A classification system in Online Marketplace system embodiments can advantageously comprise classes and/or categories corresponding to specific goods and/or services.

Embodiments of a certitude array can comprise scores of any known and/or convenient representation. The depicted grader profile 1702 embodiment specifically illustrates scalar score representations; in general the embodiments are not so limited. In some embodiments scores can comprise representations utilizing any known and/or convenient data types and structures. By way of non-limiting examples, a score representation can comprise numeric and non-numeric forms, scalars, vectors, arrays, strings, words, and/or structures comprising a variety of such forms.

Figure 18:
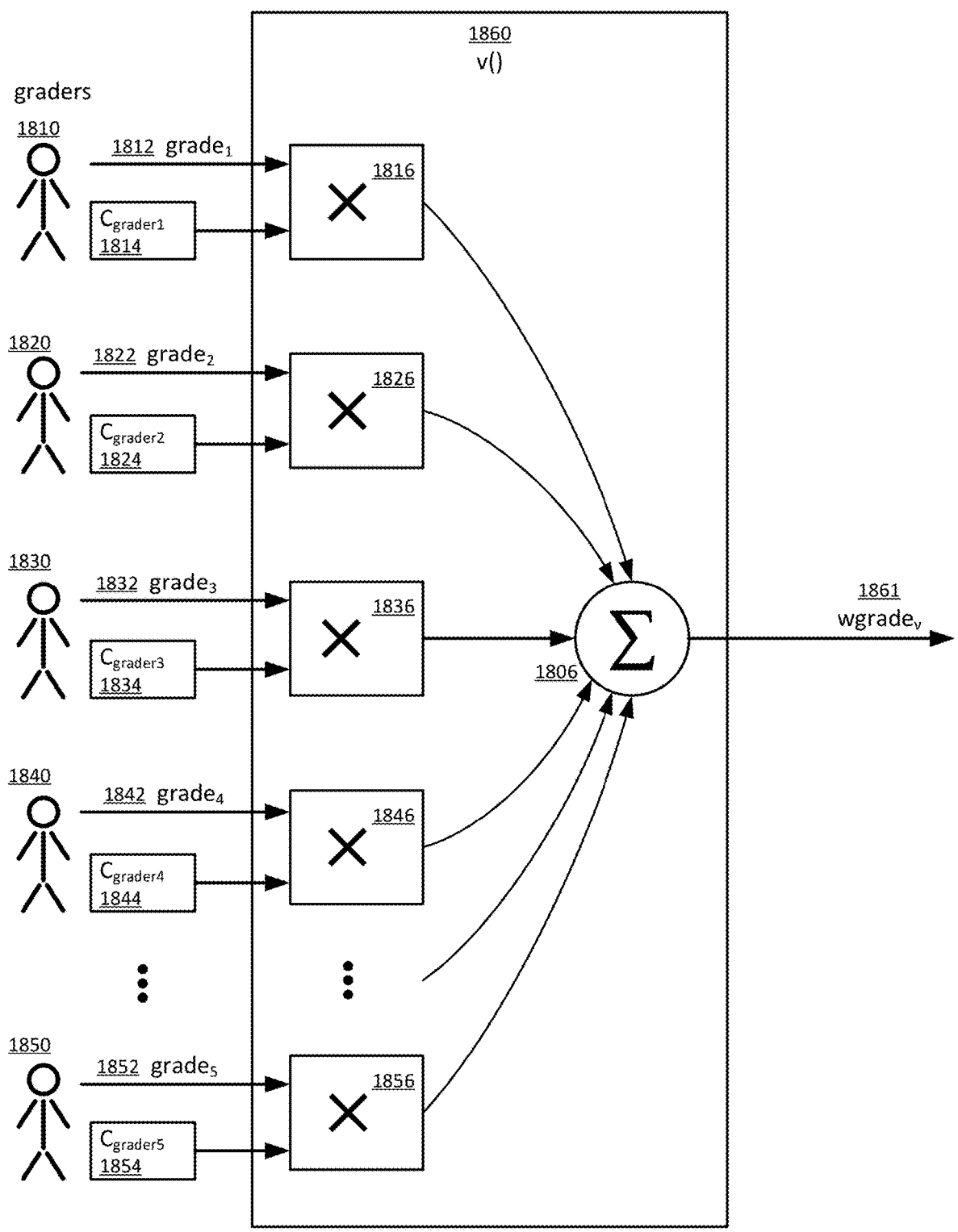
FIG. 18 depicts an exemplary embodiment of system for determining a weighted grade.

FIG. 18 depicts an exemplary embodiment of a system for determining a weighted grade corresponding to a specific item. The weighted grade is shown as $wgrade_v$ 1861. A user can review an item and provide comments and/or a grade corresponding to a gradable item. A user that provides a grade can be described as a grader 1810 1820 1830 1840 1850. By way of non-limiting examples, a gradable item can comprise one or more of a post or listing, a facet of a post or listing, a user, a review, and/or a grade corresponding to a gradable item and provided by another grader.

Graders 1810 1820 1830 1840 1850 can provide respectively corresponding grades: grade$_1$ 1812, grade$_2$ 1822, grade$_3$ 1832, grade$_4$ 1842, and grades 1852, all corresponding to the same specific gradable item. In weighting function v( ) 1860, each of the input grades can be processed by functions 1816 1826 1836 1846 1856 responsive to scores according to the class/category of the graded item, and sourced by each of the respectively corresponding graders' credulity arrays 1814 1824 1834 1844 1854. The results of functions 1816 1826 1836 1846 1856 can be further combined by functions of combining node 1806. The resulting output of combining node 1806 thus provides wgrade$_v$, a grade weighted by individual grades 1812 1822 1832 1842 1852 from a set of graders 1810 1820 1830 1840 1850 according to each of the graders' credulity scores.

In some embodiments, the weighted grade wgrade$_v$ can be calculated as a simple weighted average of grades 1812 1822 1832 1842 1852. For example, the graders can each provide grades comprising values within a specified range, such as 1 to 10. A credulity score for each grader, corresponding to the class/category of the graded item, can be within a specified range bounded by a minimum value and a maximum value. For example, the minimum value can be 0.0 and the maximum value 1.0. Each function 1816 1826 1836 1846 1856 can be a simple numerical multiplication of the corresponding input grade with the corresponding scalar credulity score for the grader and the classification/category. In such a case, the combining node simply computes the sum of its inputs and scales by the sum of the credulity scores. In such an embodiment, a calculation of the weighted grade wgrade$_v$ 1861 can be expressed as:

$$wgrade_v = \sum_{i=1}^{n} (grade_i)(scorew_{grader_{i,cla}}) \Big/ \sum_{i=1}^{n} (scorew_{grader_{i,cla}}) \quad \text{Eqn. 1}$$

where scorew$_{grader_{i,cla}}$ is a credulity score for class or category cla corresponding to the i$^{th}$ grader (grader$_i$), and, n is a count of grades, hence graders, to be combined. A depicted embodiment 1801 comprises five explicitly illustrated grades and graders, and thus can correspond to n=5. In other embodiments n can have a variety of values, as indicated by ellipsis in the figure. In an embodiment, an 'unweighted' version of wgrade$_v$ can be provided by evaluating Eqn. 1 with all scorew$_{grader_{i,cla}}$ set to unity. That is, wgrade$_v$ becomes a simple arithmetic average of the input grades.

In some embodiments a weighting function v( ) 1860 can comprise any known and/or convenient transformation, responsive to grade and credulity inputs, providing a weighted grade wgrade$_v$ 1861. The specific weighted average function described herein is just one non-limiting example of such transforming functions. In general, a weighting function embodiment can comprise one or more of a variety of procedures and/or mathematical functions, including but not limited to linear, non-linear, polynomial, continuous, discontinuous, and/or filtering over time.

In some embodiments, a credulity score corresponding to a specific grader can have a plurality of components. For example, an individual score corresponding to a specific class or category can comprise a weight value, an offset value, and a scale value. In such an embodiment, the offset and scale values can be utilized to normalize a specific grader's grades with respect to another grader or set of graders. Using the 'weight' score value scorew described above, a weighting function further comprising offset (scoref) and scale (scores) can be expressed as:

$$wgrade_v = \sum_{i=1}^{n} (grade_i) \left( (scorew_{grader_{i,cla}} * scores_{grader_{i,cla}}) + scoref_{grader_{i,cla}} \right) \Big/ \sum_{i=1}^{n} (scorew_{grader_{i,cla}}) \quad \text{Eqn. 2}$$

Figure 19:
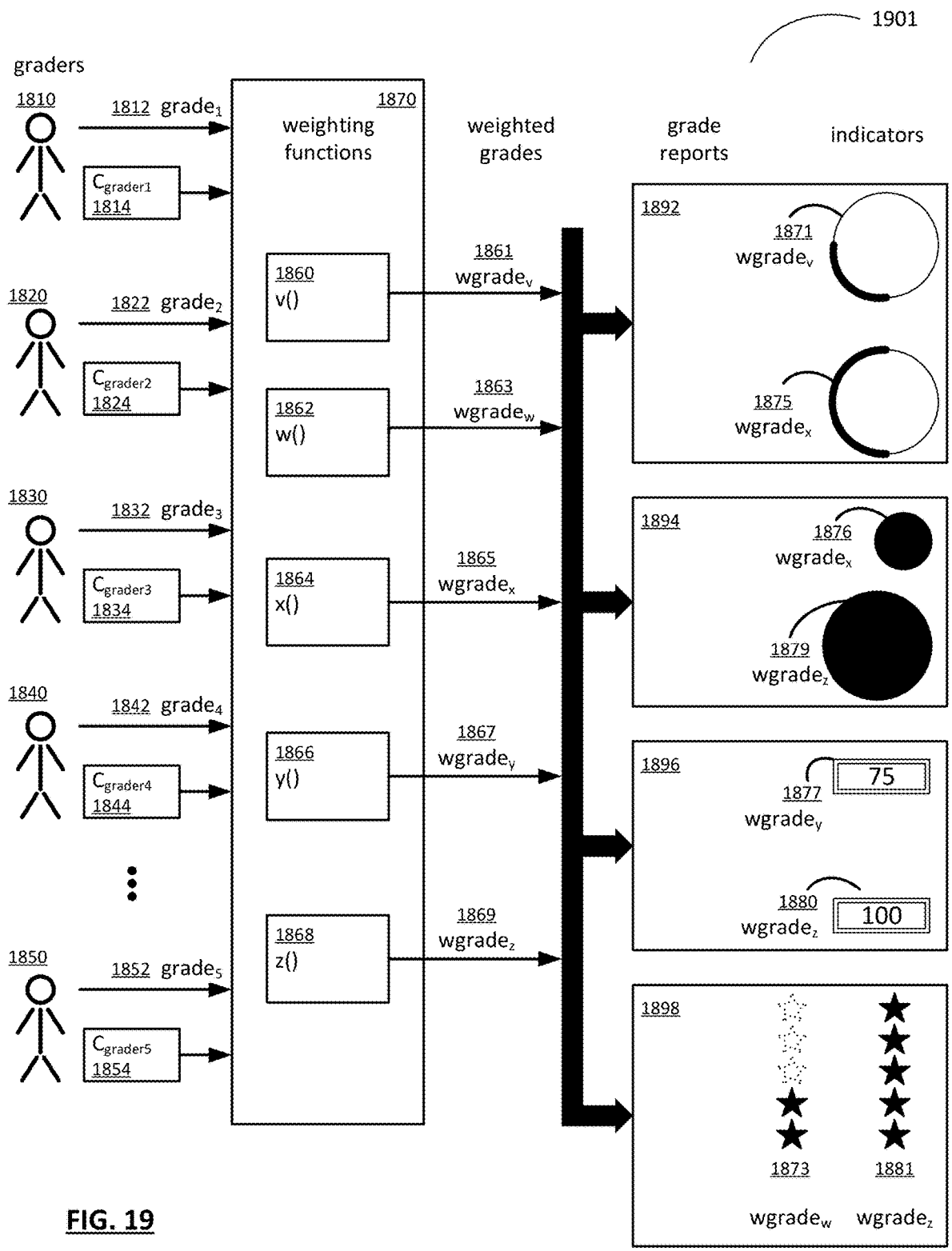
FIG. 19 depicts an exemplary embodiment of a system for determining weighted grades, and, providing grade reports and indicators corresponding to the weighted grades.

FIG. 19 depicts an exemplary embodiment of a system 1901 for determining weighted grades, and, providing grade reports and indicators corresponding to the weighted grades. Grade reports 1892 1894 1896 1898 comprising indicators are depicted in the figure. An indicator can graphically represent the value of a weighted grade.

In some embodiments, a post can comprise one or more gradable items. The post can further comprise one or more grade reports corresponding to one or more of the gradable items. The post can further comprise grade reports corresponding to various combinations of the gradable items. A grade report can comprise: a weighted and/or unweighted grade responsive to a grade provided by a specific grader; and/or, a weighted and/or unweighted grade responsive to grades provided by a plurality of graders.

Grade report 1892 depicts indicators 1875 1871 respectively corresponding to weighted grades wgrade$_x$ 1865 and wgrade$_v$ 1861. The highlighted fraction of each circle's perimeter can indicate a value of a weighted grade. Thus indicators 1875 1871 can correspond to wgrade$_x$ 1865 and wgrade$_v$ 1861 example values of 0.25 and 1.0, respectively, for a range of 0.0 to 1.0.

Grade report 1894 depicts indicators 1879 1876 respectively corresponding to weighted grades wgrade$_z$ 1869 and wgrade$_x$ 1865. The relative diameter of each circle can indicate the value of a weighted grade. Thus indicators 1879 1876 can correspond to wgrade$_z$ 1869 and wgrade$_x$ 1865 example values of 0.5 and 1.0, respectively, for a range of 0.0 to 1.0.

Grade report 1896 depicts indicators 1880 1877 respectively corresponding to weighted grades wgrade$_z$ 1869 and wgrade$_y$ 1867. The number shown within each box can indicate the percentage value of a weighted grade. Thus indicators 1880 1877 can correspond to wgrade$_z$ 1869 and wgrade$_y$ 1867 example values of 0.75 and 1.0, respectively, for a range of 0.0 to 1.0.

Grade report 1898 depicts indicators 1873 1881 respectively corresponding to weighted grades wgrade$_w$ 1863 and wgrade$_z$ 1869. The number of highlighted star symbols within each group of five symbols can indicate the value of a weighted grade. Thus indicators 1873 1881 can correspond to wgrade$_w$ 1863 and wgrade$_z$ 1869 example values of 0.4 and 1.0, respectively, for a range of 0.0 to 1.0. In some embodiments, other ranges can be employed. By way of non-limiting example, indicators 1873 1881 can correspond to wgrade$_w$ 1863 and wgrade$_z$ 1869 example values of 2 and 5, respectively, for a range of 0 to 5 stars.

Weighting functions 1870 can comprise v( ) 1860 as depicted and described in FIG. 18 and further comprise weighting functions w( ) 1862, x( ) 1864, y( ) 1866, and z( ) 1888. In some embodiments these weighting functions can differ from each other. These weighting functions can provide, respectively, weighted grades grade$_v$ 1861, grade$_w$ 1863, grade$_x$ 1865, grade$_y$ 1867, and grade$_z$ 1869. Each of these functions may provide different weighted grades, even when each is responsive to one or more of the same grade and/or certitude inputs.

Figure 20:
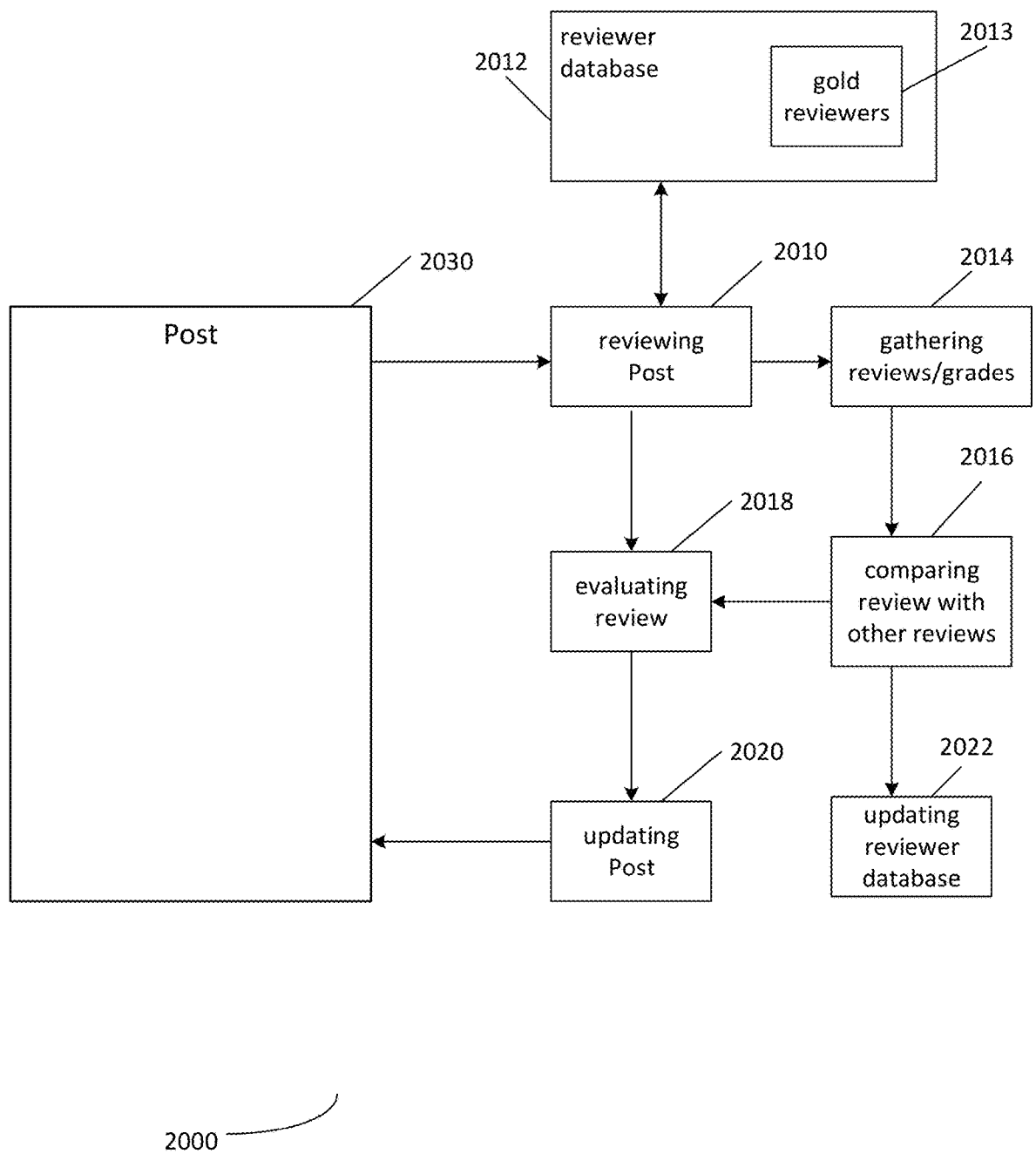
FIG. 20 depicts a block diagram of a system and method for grading and updating a post.

FIG. 20 depicts a block diagram of a system and method for grading and updating a post. In step 2010 a post 2030 can receive a review and/or an associated grade, from one or more reviewers of the post. Various e-commerce systems can comprise a post 2030, such as, by way of example and not limitation, the resume service described herein, social media platforms, and/or online marketplaces. For example, an online marketplace post can comprise a sales listing. Element 2030 of FIG. 20 is labeled as a 'Post' however, the depictions and descriptions of this figure also apply to other embodiments in which element 2030 can comprise one or more elements of a post, also described herein as a facet of a post.

Then in step 2012 a database can be accessed to determine a score associated with a reviewer and in some embodiments, a specified class or category associated with the post under review. Such a database 2012 can comprise a reviewer database 612 such as depicted and described in FIG. 6. Database 2012 can also comprise and be described as a grader database, as it can comprise data corresponding to users that provide grades. A grader's score and/or scores can be based upon any known, convenient and/or desired criteria, such as veracity/accuracy of previous reviews and/or grades provided, academic standing, degree of familiarity with subject area of the post and/or any other known, convenient and/or desired criteria. A grader's score can comprise one or more elements of a credulity score such as depicted and described in FIG. 17. In some embodiments, certain graders of posts, such as university professors or verified former employers (and/or any other known, convenient and/or desired grader types) can be assigned a perfect or 100% veracity/accuracy score. Such graders can be described as gold graders and/or gold reviewers 2013. However, in alternate embodiments, a grader can be assigned a veracity/accuracy score based upon degree of agreement with other graders' evaluations as evaluated in steps 2014 and 2016. Such a veracity/accuracy score can correspond to a level of certitude.

Step 2014 can comprise gathering evaluations of the post, such as reviews and/or grades provided for the post. Then, in step 2016 the current evaluation of the post by the grader can be compared to the average (or any other combination of previous evaluations of the post). Hence a degree of veracity/accuracy of the current review can be determined, based on agreement with the average of previous reviews and/or based on any other combination of previous evaluations of the post. Based on the degree of veracity/accuracy of the current review, a score associated with the reviewer/grader can be adjusted and a database 2012 associated with the grader can be updated in step 2022. In some embodiments, such an adjustment can comprise an increase or decrease of a scalar score.

A post 2030 can comprise graphical and/or other indicators of grades associated with the post, as depicted and described in FIG. 19. Step 2020, updating the Post, can comprise updating such indicators, responsive to reviews/grades and graders' scores associated with the post.

By way of non-limiting example, if a user makes a post and a reviewer provides that user's post a grade of 5 (on a scale of 1-5), but others have evaluated the user's post and each provided a grade of 2 (on a scale of 1-5), the reviewer's score can decrease toward a minimum level of credulity, as the reviewer's evaluation of the user's post is not calibrated with the opinions of other reviewers. Similarly, if a user makes a post and a reviewer provides that user's post grade of 4 (on a scale of 1-5), and 90% of others have evaluated the user's posting similarly by providing a grade of 4 (on a scale of 1-5), the reviewer's score can increase toward a maximum level of credulity, as the reviewer's evaluation of the user's post is calibrated with the opinions of other reviewers. As noted, some reviewer scores can be fixed and/or can be fixed for particular categories and/or classes, but not for all categories and/or classes. By way of non-limiting example, if a user makes a post and a professor-reviewer provides that user's post a grade of 2 (on a scale of 1-5), but others have provided the user's post a grade of 5 (on a scale of 1-5), the professor-reviewer's score can remain the same, as the professor-reviewer's score is fixed. In yet still further embodiments, if a user makes a post and a professor-reviewer provides that user's post a grade of 1 (on a scale of 1-5), but others have provided the user's post a grade of 5 (on a scale of 1-5) the other non-professor-reviewer's scores can decrease towards a minimum level of credulity, as the reviewers evaluation of the user's post is not calibrated with the professor-reviewer's evaluation. It should be noted that the 1-5 scale is arbitrary in the above-provided non-limiting examples, and any known, convenient and/or desired metric can be employed.

The embodiments are not limited to single-dimensioned scores, nor to single-dimensioned adjustments and/or interpretations of scores. For example, a single score could comprise multiple dimensions, such as: credulity, scale, and offset. In some embodiments, credulity can represent and/or be interpreted as an overall level of confidence in the veracity and/or utility of the grader's provided grade and/or grades. Scale and offset can be interpreted as parameters describing a linear transformation between a specific grader's grades and that of a reference grader, such as a gold grader. That is, in some embodiments, a specific grader can be regarded and thus scored as highly credible, even though the grades they provide are generally offset and scaled with respect to a reference grader.

Figure 21:
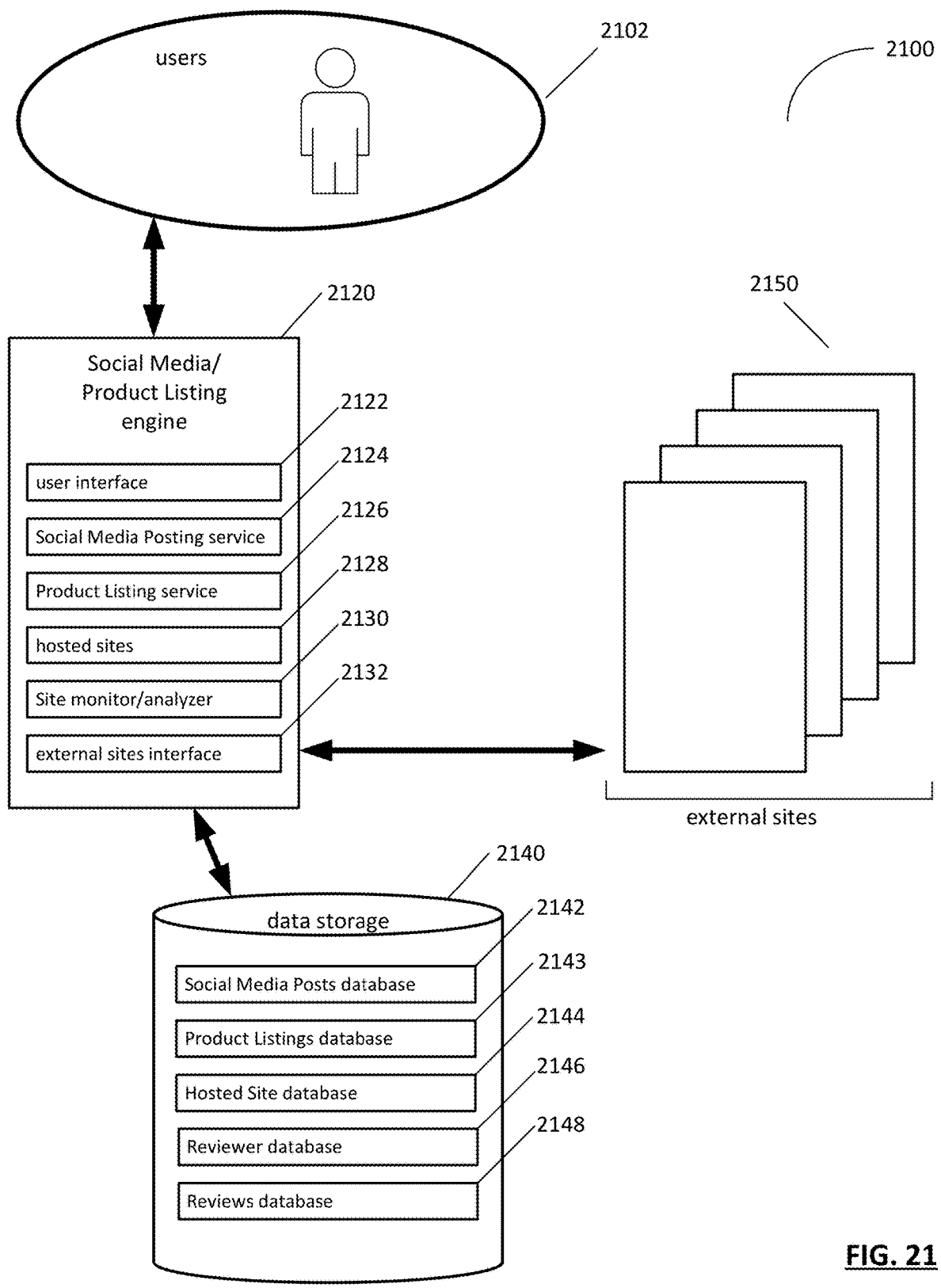
FIG. 21 depicts an exemplary embodiment of a system for generating and updating social media posts and product listings.

FIG. 21 depicts an exemplary embodiment 2100 of a system for generating and updating social media posts 2500 and product listings 2301 2600.

The embodiment depicted in FIG. 21 can comprise a plurality of users 2102, a social media/product listing engine (SM/PL engine) 2120, a data storage 2140 and, in some embodiments, external sites 2150.

In the embodiment depicted in FIG. 21, the SM/PL engine 2120 can comprise a user interface 2122, a social media posting service 2124, a product listing service 2126, one or more hosted sites 2128, a site monitor/analyzer 2130 and an external sites interface element 2132. The user interface 2122 can allow users to create unique accounts and manage basic information associated with their accounts. An account can comprise a profile, such as a grader profile 1750. The social media posting service 2124 can allow users to create and/or categorize social media posts that can be tied to their respective accounts and associated data storage 2140. The product listing service 2126 can allow users to create and/or categorize product listings that can be tied to their respective accounts and associated data storage 2140. The hosted sites 2126 can comprise virtual locations in which users can instantiate social media posts and/or product listings and/or facets of such posts and listings. Such posts and listings can comprise gradable items.

The hosted sites can provide a virtual location in which users can provide reviews and/or grades for gradable items. In addition, reviewable items and gradable items can receive reviews and/or grades. Reviews and/or grades provided and/or received can be tied to respective user accounts.

The site monitor/analyzer 2130 can automatically detect updates to hosted sites 2128 and/or external sites 2150 pertaining to a user's postings, listings, reviews given and/or received, and grades given and/or received. In some embodiments, the SM/PL engine 2120 can comprise an external sites interface 2132 that allows the SM/PL engine 2120 to actively access sites run by third parties and actively access or scrape information from those external sites for use in updating user's profiles such as a grader profile.

Data storage 2140 can comprise data associated with social media posts 2142, product listings 2143, hosted sites 2144, reviewers 2146, and reviews 2148. The data can be stored in data storage 2140. In some embodiments, such data storage can comprise and be implemented as databases: social media posts database 2142, product listing database 2143, hosted site database 2144, reviewer database 2146, and reviews database 2148, respectively. Data storage 2140 can further comprise additional information, such as databases comprising reviews and/or grades received and/or provided corresponding to individual users, posts and listings corresponding to individual users, and facets of such posts and listings.

In operation 2102, a user can enter social media and/or product listing information into the SM/PL engine 2120. The engine 2120 can respond by instantiating and/or modifying a social media post and/or product listing. Such a post or listing, and/or facets thereof, can be categorized. In some embodiments such categorization can take the form of specifying a class within a specified classification system.

Figure 22:
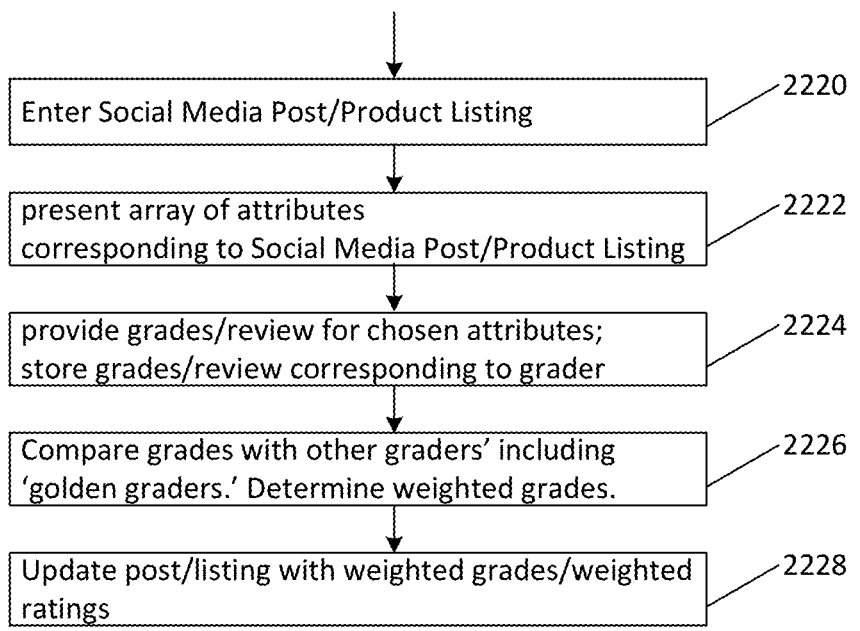
FIG. 22 depicts an exemplary process for weighted grading of ratable structures.

FIG. 22 depicts an exemplary process for weighted grading of ratable structures. In the embodiment depicted in FIG. 22, ratable structures can be instantiated in a corresponding database. In step 2220 such structures can be entered. By way of example and not limitation, a ratable structure can comprise a resume of the resume-generating service described herein, a social media post, a product listing, and/or items and/or components of such structures. In FIG. 21, databases for social media posts 2142, product listings 2143, and hosted sites 2144 such as a resume-generating service, are depicted.

In response to a request and/or other specification, a system embodiment can present a specific ratable structure. Such a presentation can comprise gradable items corresponding to the structure. In step 2222 such gradable items can be presented. Gradable items can comprise, by way of example and not limitation, an array of attributes corresponding to the structure.

In some embodiments, a user can choose or otherwise specify specific gradable items from the presented structure. The user can provide one or more reviews and/or grades corresponding to the specified gradable items and/or corresponding to combinations of the items and/or corresponding to the ratable structure itself. Such reviews and/or grades, with linkage to the user (reviewer, grader), can be stored. In step 2224, gradable items can be chosen and graded and/or reviewed, and those grades and/or reviews can be stored.

In some embodiments, the stored grades can be processed in combination with grades provided by other users/graders, as depicted and described in FIG. 18 and FIG. 19. In some embodiments such processing can comprise comparison with other specific graders, such as 'golden graders' as described with respect to FIG. 17. The result of such processing can comprise weighted grades, such as wgradev 1861 depicted and described in FIG. 18 and FIG. 19. In turn, one or more such weighted grades can be provided within grade reports to the presented structure. In step 2226 the stored grade(s) corresponding to the user/grader can be processed and weighted grade(s) can be determined. The presented structure can responsively update indicators that represent and/or correspond to weighted grades. Such weighted grades and/or indicators can also be referred to as weighted ratings. In step 2228 the presented structure can be updated responsive to the weighted grades provided.

Figure 23:
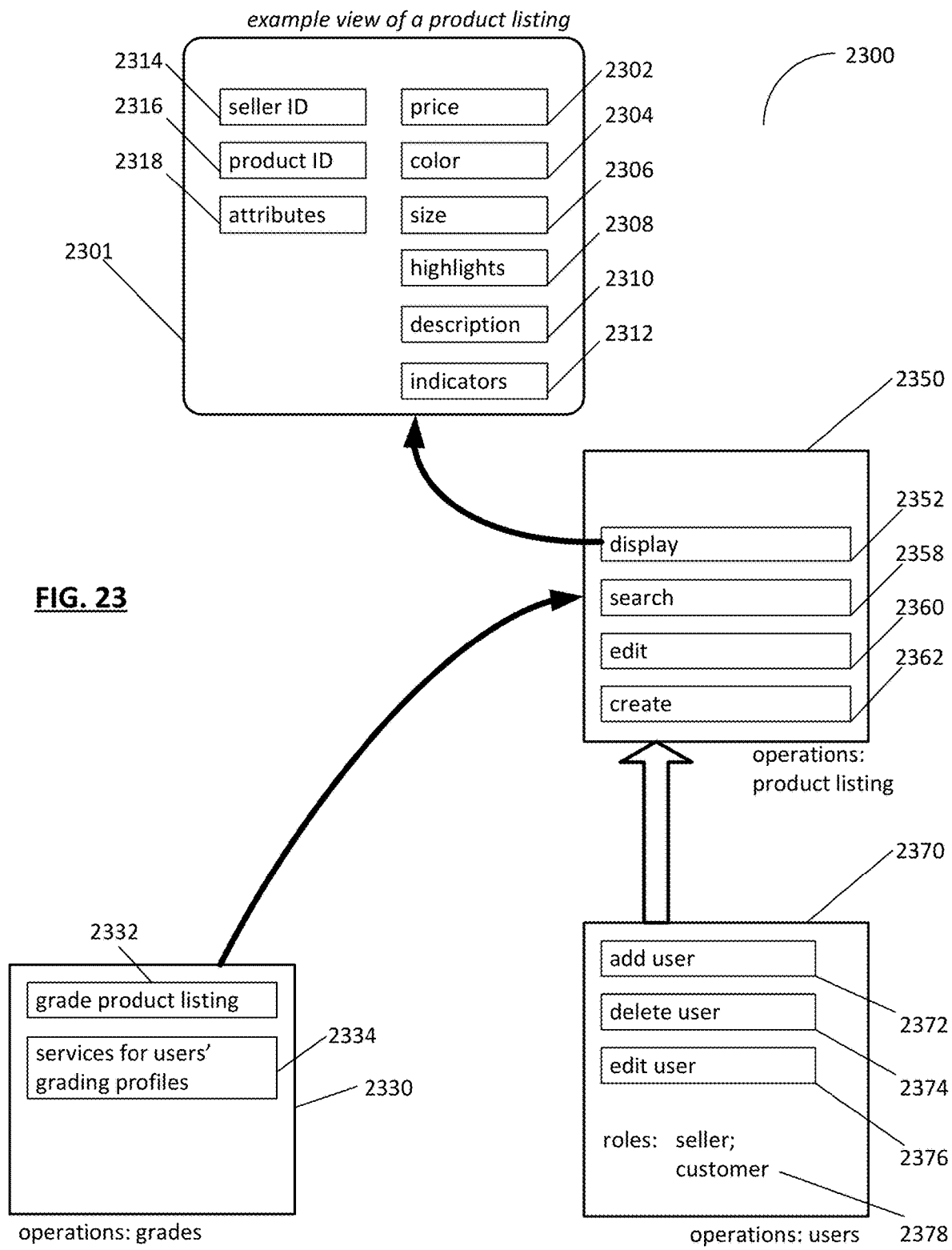
FIG. 23 depicts a block diagram of an embodiment of a system for providing graded product listings.

FIG. 23 depicts a block diagram of an embodiment of a system for providing graded product listings. In the embodiment depicted in FIG. 23, the system 2300 can be comprised of a grades (or ratings) system 2330, a product listings system 2350 and a users system 2378, all configured to interactively deliver a product listing 2301 with associated weighted grades, the grades corresponding to gradable items pertaining to the product listing.

A product listing 2301 can comprise items such as instantiations of price 2302, color 2304, size 2306, highlights 2308, description 2310, indicators 2312, seller identity 2314, attribute(s) of the seller 2318, and product identification 2316. Gradable items corresponding to this product listing can comprise the depicted items alone and/or in combination. Indicators 2312 can comprise graphical elements representing weighted grades and/or combinations of weighted grades corresponding to specified gradable items corresponding to the product listing. An 'unweighted' grade can be described as a special case of a weighted grade.

The grades system 2330 can receive grades 2332, and other grading activity and feedback, corresponding to a user. The grades system can maintain data related to the qualities and/or characteristics 2334 of a user/grader, such as a grader profile, as depicted and described by FIG. 17. A grader profile 1750 can comprise certitude scores that can be employed in determining weighted grades. Weighted grades can be employed to accordingly update a product listing 2301, such as by updating indicators 2312. The weighting of grades can be accomplished in accordance with any known, convenient and/or desired weighting system including such systems as described herein.

The product listing system 2350 can be used to access and thereby provide a product listing 2301 for a user to view. Specifications for display 2352 of the product listing can be provided. In some embodiments a search 2358 can be conducted to sift product listings. In some embodiments, search queries can be edited 2360 and/or created 2362 as desired so that product listings can be screened/displayed as desired.

The system 2300 can comprise a users system 2370 that allows the addition 2372 of users, deletion 2374 of users, editing 2376 of users, and assignment of user roles 2378 to system users.

In operation, a user can register with the users system 2370 and then construct a query via the product listing system 2350. The product listing system can then retrieve a product listing 2301 responsive to the query, and present the product listing according to display specifications 2352. In some embodiments, the user can view and/or otherwise access indicators 2312 of weighted grades corresponding to gradable items corresponding to the product listing. In some embodiments, the user can be a grader and can provide grades corresponding to gradable items of the product listing, and, the product listing can interactively respond to such grades by updating indicators 2312.

Figure 24:
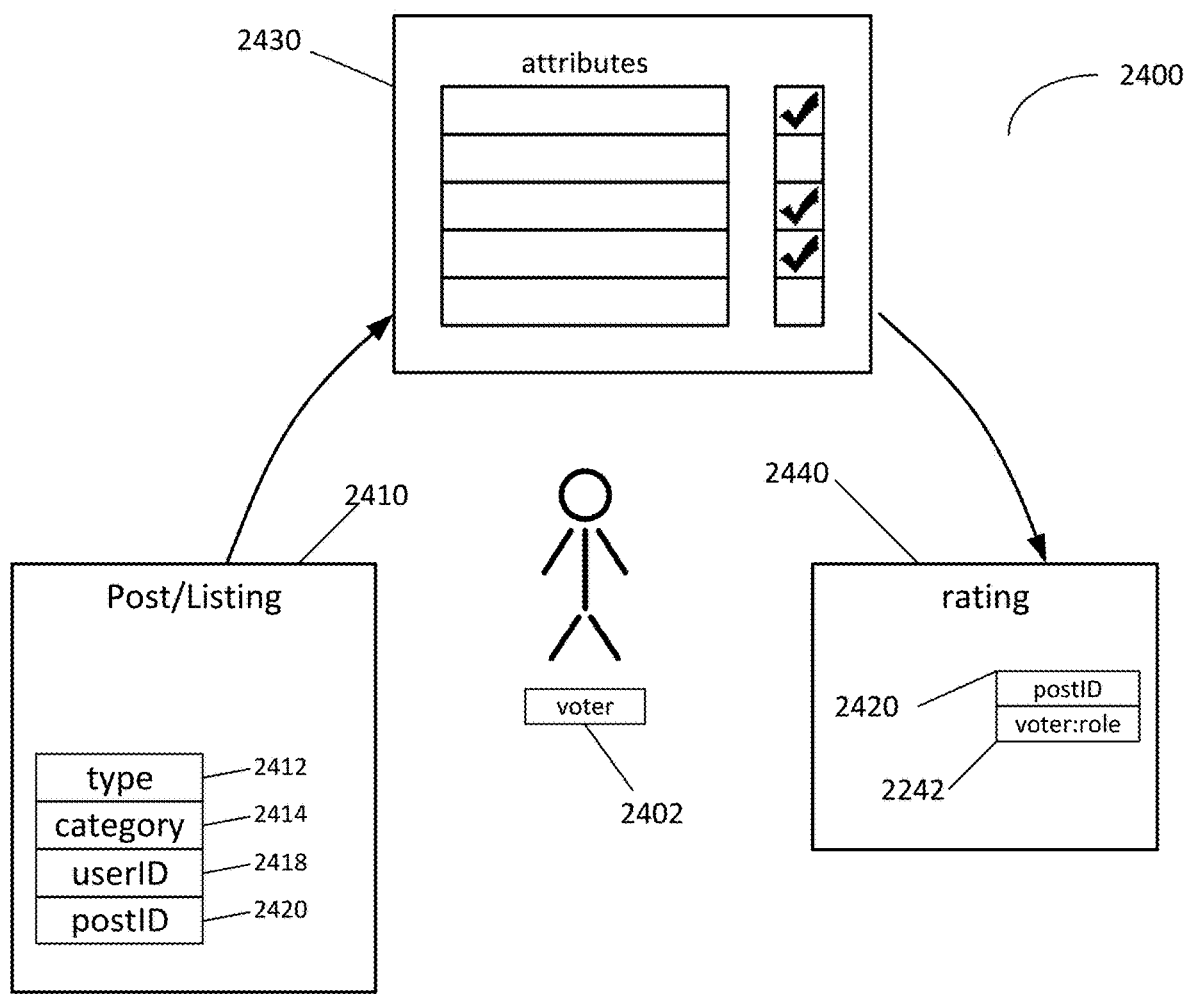
FIG. 24 depicts a block diagram of an exemplary embodiment of a system for providing grades for ratable structures.

FIG. 24 depicts a block diagram of an exemplary embodiment of a system 2400 for providing grades for ratable structures such as social media posts and product listings. Such providing of grades can also be described as providing ratings. In the embodiment depicted in FIG. 24, the system 2400 can comprise a posting system 2410, an attributes linking system 2430 and a rating system 2440. In operation, users can post in the posting system 2410 and the posting can be characterized and/or categorized by a type of posting 2412, a category of posting 2414, a user ID 2418 and a posting ID 2420, such that a posting can be associated with a corresponding user. Another user such as voter 2402 can then evaluate the posting. Attributes 2430 of the posting and voter 2402 can then be compared to determine a weight that can be associated with the grade provided by the voter. In some embodiments, credulity scores as depicted and described with regards to grader profiles 1750 (FIG. 17) can be employed in determining such weights. Additionally, the posting ID 2420 and the voter/grader's role connection with the user can be recorded in the grading system 2440.

By way of non-limiting example, if a user posts an article about electrical fields, and the grader were a professor of electrical engineering, there would be a high degree of correlation between the subject of the posting and the grader's expertise and thus the credulity score and weighting of the grader's evaluation would consequently be relatively high. However, if the grader were known solely to be a professor of French literature, then there would be little correlation between the subject of the posting and the grader's expertise. Thus the credulity score and weighting of the grader's evaluation would be relatively low. Similarly, in some embodiments, the evaluation of a user's post by a former employer of the user can be assigned a specific score and/or weight. As previously noted, other systems related to the degree of correlation of a grader-provided grade with some metric of previous grades can also be used to evaluate the grader-provided grade and consequently weight the provided grade.

In some embodiments, gradable structures such as the aforementioned social media posts and product listings can comprise gradable items. The described system 2400 can be employed to provide grades for such gradable elements. By way of non-limiting example, in some embodiments the system 2400 can provide grades corresponding to and in evaluation of a particular user such as one identified by user ID 2418, as well as providing grades for an entire post provided by that user.

In some embodiments, attributes 2430 of a ratable structure such as a product listing and the grader 2402 can be compared to determine a credulity score and/or weight that can be associated with the grade provided by the grader. By way of non-limiting example, if a grader has personal customer experience of a product depicted in a product listing, there would be a relatively high degree of correlation between the listed product and the grader's knowledge of the product. Thus the credulity score and weighting of the grader's evaluation would consequently be relatively high.

Figure 25:
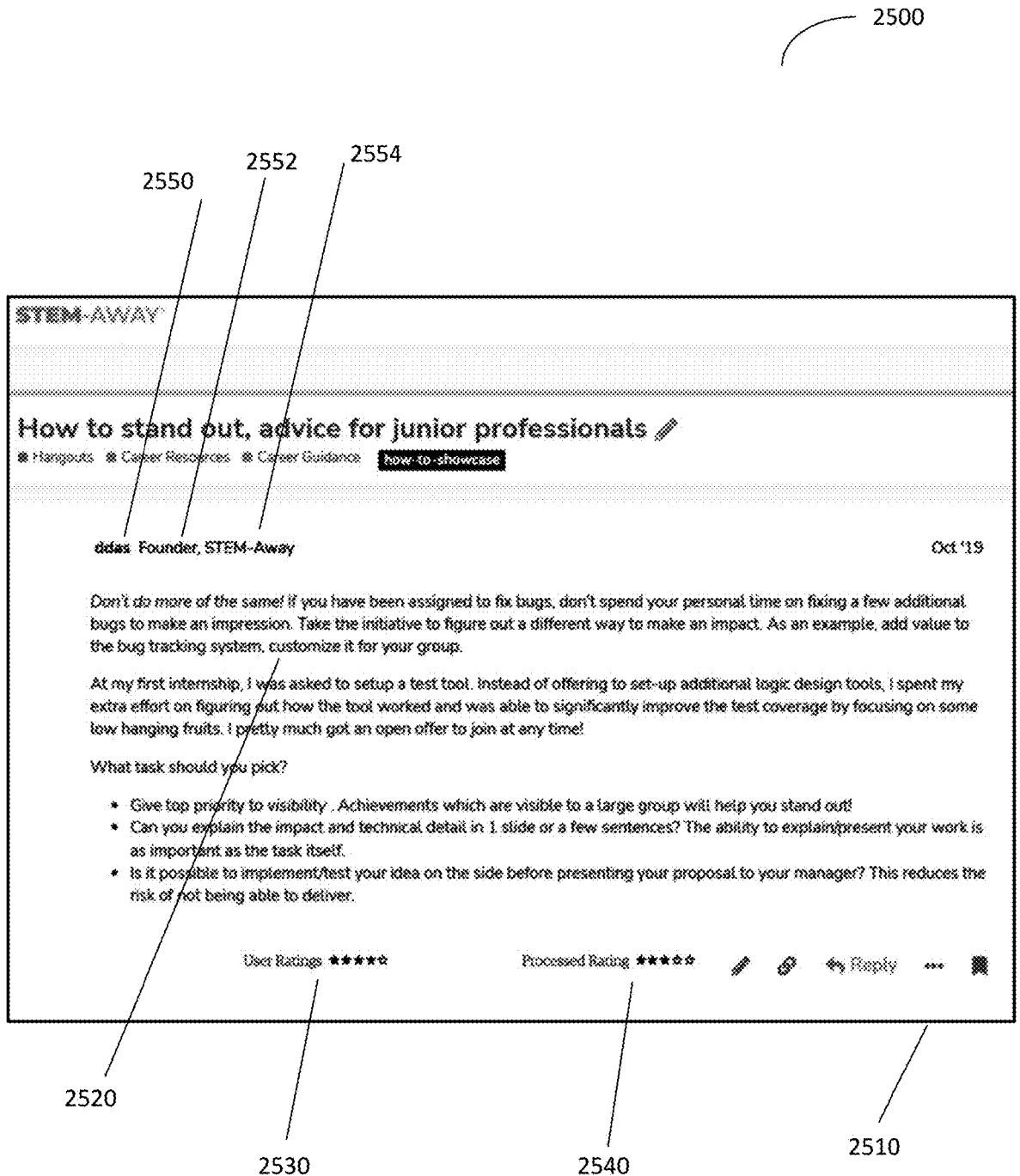
FIG. 25 depicts an exemplary embodiment of a forum post.

FIG. 25 depicts an exemplary embodiment of a post 2510 to a forum, that is, a forum post. A system embodiment such as, by way of non-limiting examples, a resume service, a social media platform, or an online marketplace, can comprise such a post. Elements of the post can comprise: user identity 2550 of the author, role 2552 of the author, organization identity 2554 of the author, content 2520, and grade indicators 2530 2540. Each of such elements of a post can each be described as a facet of a post. A specified combination of such elements of a post can also be described as a facet of a post.

In the depicted example embodiment, each grade indicator 2530 2540 can show a different value, and each value can be provided by a different weighting function. By way of non-limiting example, indicator 2530 'User Rating' can represent a value provided by Eqn. 1 evaluated with all $scorew_{grader_{i,cla}}$ set to unity, hence an 'unweighted' grade responsive to a plurality of graders. Indicator 2540, 'Processed Rating' can represent a value provided by Eqn. 1 with all $scorew_{grader_{i,cla}}$ responsive to differing credulity scores provided from the graders' profiles, hence a 'weighted' grade responsive to for example, the same plurality of graders. Indicators 2530 2540 can correspond to the same one or more specific items (facets) of the post, such as the content 2520 and/or the author 2550.

Figure 26:
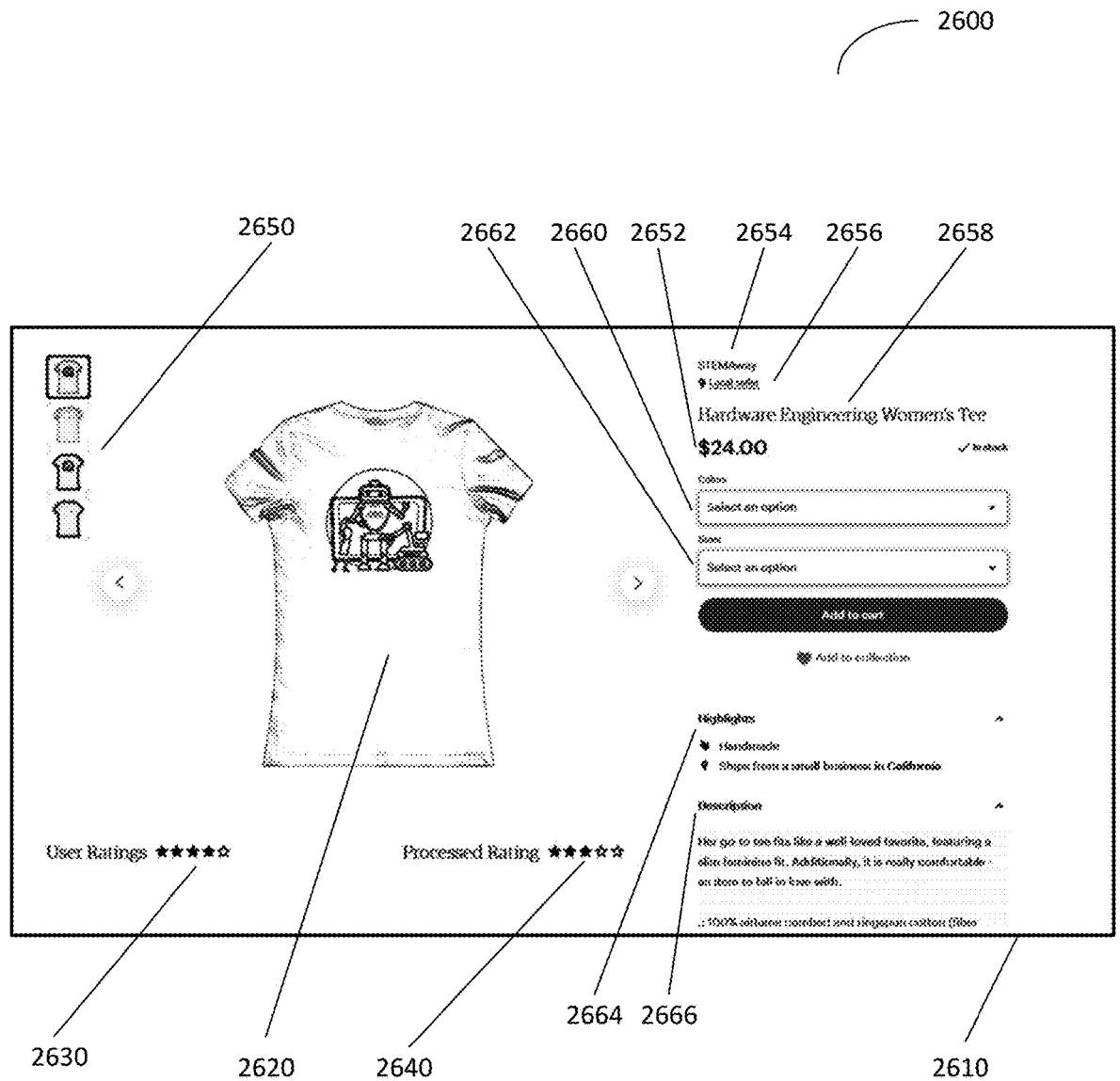
FIG. 26 depicts an exemplary embodiment of a post comprising a product listing.

FIG. 26 depicts an exemplary embodiment of a post 2610 comprising a product listing. An online marketplace embodiment can comprise one or more such product listings. Elements of the post can comprise: price 2652, seller identity 2654, attribute(s) of the seller 2656, product identification 2658, color (choices and/or selected color) 2660, size 2662, highlights 2664, description 2666, graphic representations of the product 2620 2650, and grade indicators 2630 2640.

In the depicted example embodiment, each grade indicator 2630 2640 can show a different value, and each value can be provided by a different weighting function. By way of non-limiting example, indicator 2630 'User Rating' can represent a value provided by Eqn. 1 evaluated with all $scorew_{grader_{i,cla}}$ set to unity, hence an 'unweighted' grade responsive to a plurality of graders. Indicator 2640, 'Processed Rating' can represent a value provided by Eqn. 1 with all $scorew_{grader_{i,cla}}$ responsive to differing credulity scores provided from the graders' profiles, hence a 'weighted' grade responsive to for example, the same plurality of graders. Indicators 2530 2540 can correspond to the same one or more specific items (facets) of the post, such as the identified product 2658 and/or the seller 2656.

Figure 27:
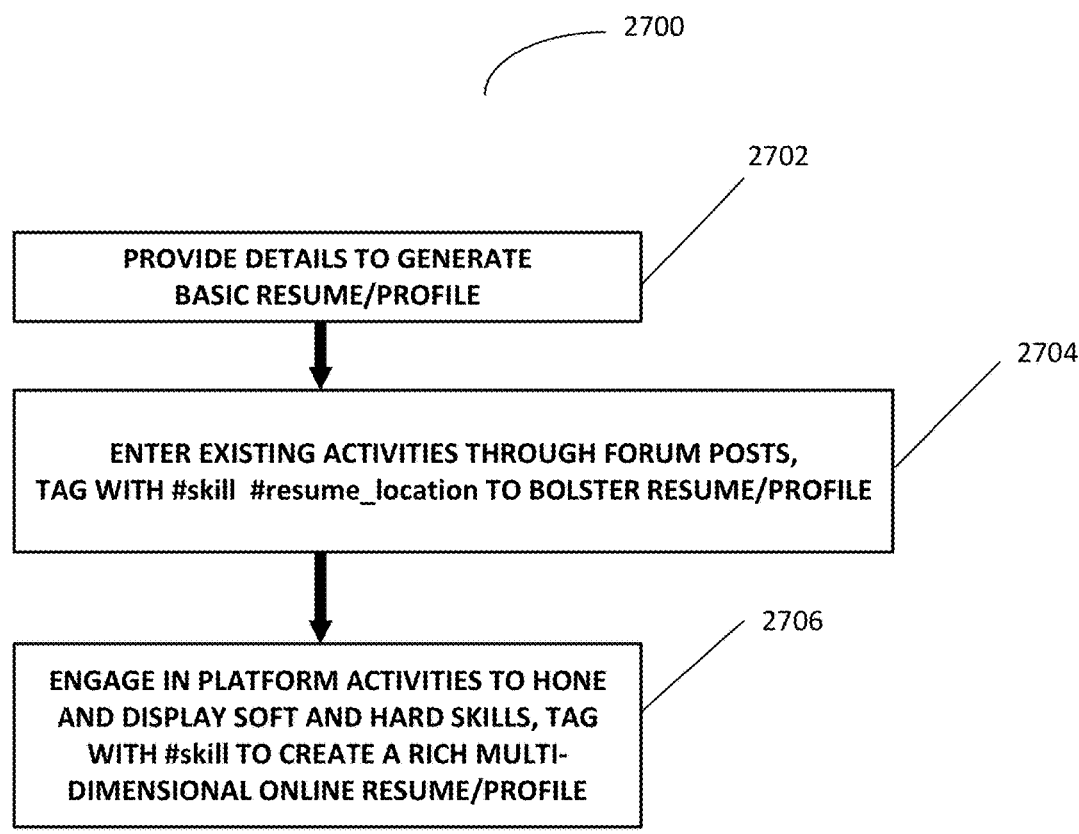
FIG. 27 depicts a high-level block diagram of an embodiment for generating and updating a resume.

FIG. 27 depicts a high-level block diagram of an embodiment of a system and method for generating and updating a resume 2700. In some embodiments, a resume as herein described can comprise a user profile corresponding to a user/registrant of a social media site. Personal details/elements can be entered into the system in step 2702 via online (or other) portal. In some embodiments, the personal details provided can include location, name, contact information, education, work experience, academic achievements and/or any other known, convenient and/or desired information regarding a user/registrant. The personal details can then be used to create a basic resume and/or social media user profile for the user/registrant. In step 2704, activities for incorporation in the resume can be entered via forum posts and such forum posts can be tagged as skills, with a relevant skill tag such as #"skill", which can provide support for details/elements of a user's/registrant's resume. In some embodiments, the tagged post and/or a link to the tagged post can be displayed in a skills section, such as Technical Skills 410 as depicted in FIG. 4. By way of non-limiting example, a post tagged with #error-control-codes can be linked to a skill "error control codes" that a user has entered in the Technical Skills 410 section of a resume or social media profile. In some embodiments, an additional #'resume_location' or #'profile_location' tag can be employed to indicate location within the resume and/or social media profile. By way of non-limiting example, a post tagged with #error-control-codes can be further tagged with #resume_intro in order for the post to be highlighted in a resume introduction section, such as Introduction 404 of the resume depicted in FIG. 4. A set of tags can be specified, with each tag corresponding to a specific location or locations of a resume or social media profile. By way of non-limiting example, considering the resume 400 of FIG. 4, a set of tags can comprise #resume_about, #resume_about_intro, #resume_about_interests, #resume_about_introvideo, #resume_techskills, #resume_softskills, #resume_highlights, and so on, corresponding respectively to resume locations About 402, About Introduction 404, About Interests 406, About Intro Video 408, Technical Skills 410, Soft Skills 420, Highlights 430, and so on.

In addition, in some embodiments, in step 2706, a user/registrant can engage in (new or existing) activities (such as online activities within a prescribed forum and/or other activities, such as posting or participation on 3rd party forums and/or platforms) to hone and demonstrate soft and hard skills, and, such activities can be tagged with the relevant identifiers, such as #"skill", to create a rich, multi-dimensional, verifiable skills set and set of personal details in the user's/registrant's resume. Accordingly, posting activities can enhance a resume and provide support for assertions made in a resume.

Figure 28:
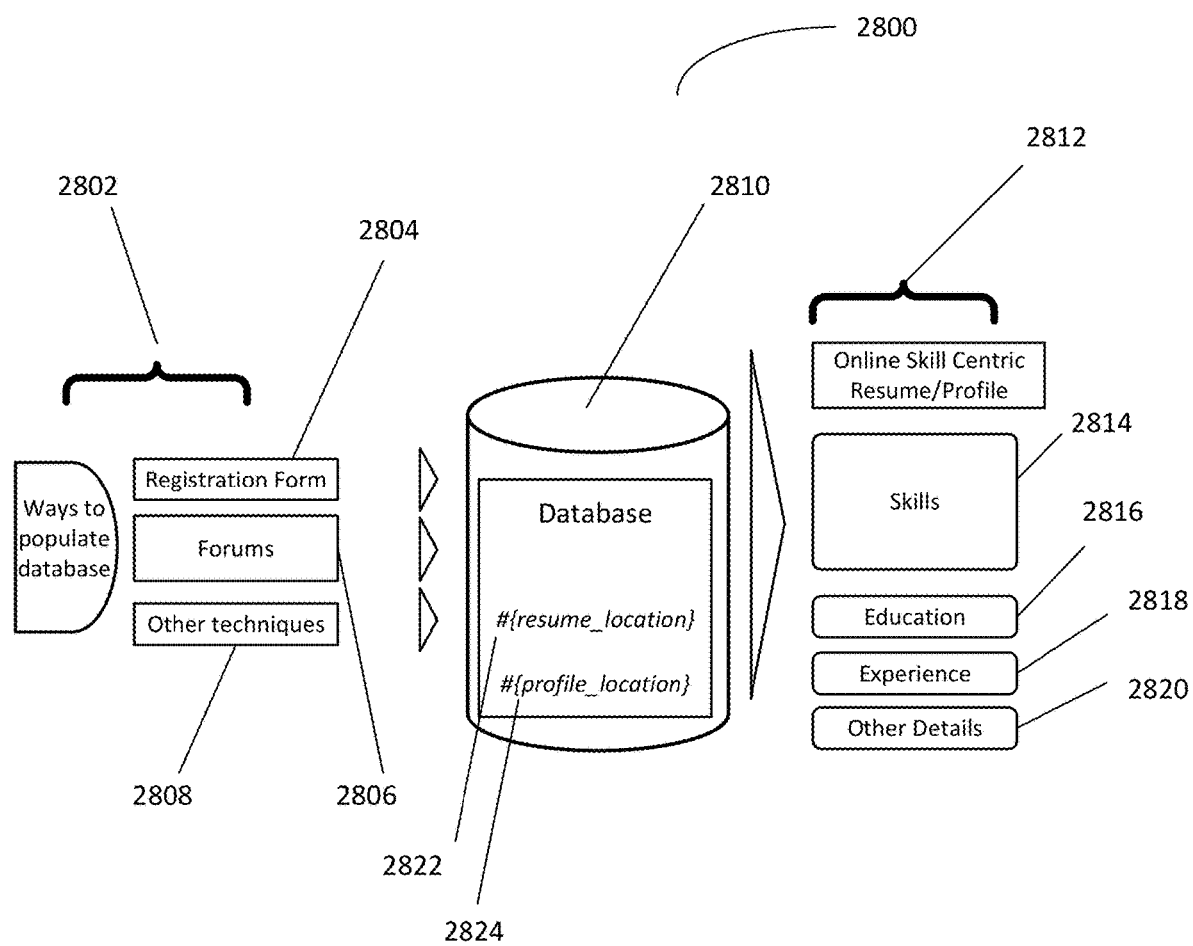
FIG. 28 depicts a high-level system diagram and embodiment for generating and updating a resume.

FIG. 28 depicts a high-level system diagram and embodiment for generating and updating a resume 2800. In some embodiments, a resume as herein described can comprise a user profile corresponding to a user/registrant of a social media site. As depicted in FIG. 28, a resume can be populated 2802 within the system in multiple ways and via multiple avenues, such as, by way of non-limiting example, a user can fill out a registration form 2804 with prescribed fields and/or user modifiable fields, wherein personal information as described above can be collected to generate a resume for the user. In some embodiments, a user can access a plurality of forums 2806 and enter information or make postings, wherein each forum can be associated with a particular skill or skills. Additionally, in some alternate embodiments, other techniques 2808, can be employed to enter resume information and/or update such resume information, such as manual input and/or data retrieval from other/3rd party sources.

The gathered resume data can then be stored in a database 2810 wherein each post made by a user can be tagged with an identifier or identifiers, such as #"skill", and associated with the relevant skill/component of the specific user's resume. Thus, as a user creates more forum posts and partakes in platform activities, their skill level can increase and their skills can be verified, providing employers more confidence in assertions made in a user's/registrant's resume and making them a more valuable candidate for particular hiring opportunities.

In some embodiments, an additional #'resume_location' 2822 or #'profile_location' 2824 tag can be employed, and stored in database 2810, to indicate location within the resume and/or social media profile. A post made by a user can be additionally tagged with such a location tag so that the post can be highlighted in the user's resume, in a section of the resume identified by the location tag.

The system can allow potential employers to view users'/registrants' resumes and/or social media profiles through a viewing engine 2812 that can be searched and view-customized by a potential employer to rank order (sub-order) users/registrants resumes in any manner desired by the potential employer, such as by skill(s) 2814, by education 2816, experience 2818 and/or other known convenient and/or employer-specified details 2820. As depicted in the skills 2814 area, in some embodiments, the degree of confidence of the user's/registrant's abilities and/or qualifications related to a particular detail in a resume can be graphically displayed, such as by a circle of increasing size (wherein size of the circle corresponds to the degree of confidence associated with a particular detail). Further, in some embodiments, the system and method can provide customized viewing of resumes based on the audience, such as viewing modes or displays for peers, mentors, managers, human resources, and/or any other known, convenient and/or desired group, which can include the same information (or a limited set of information), but in a format which may be more appropriate for the identified viewer.

Figure 29:
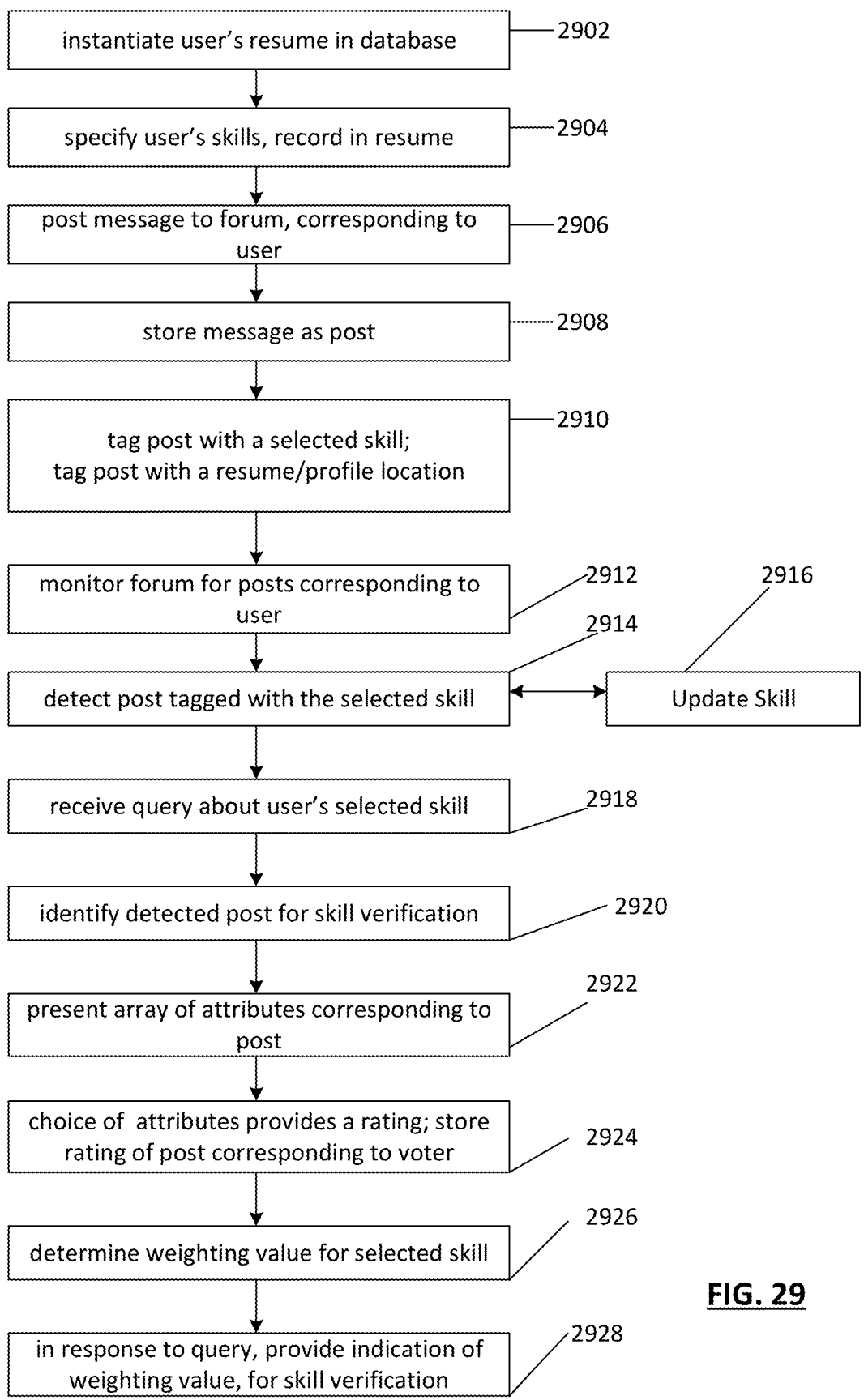
FIG. 29 depicts an exemplary embodiment of a system for generating and updating a resume.

FIG. 29 depicts an exemplary embodiment of a system for generating and updating a resume. In some embodiments, a resume as herein described can comprise a user profile corresponding to a user/registrant of a social media site. In the embodiment depicted in FIG. 29, in step 2902 a user's/registrant's resume can be instantiated in a resume database and then in step 2904 a user's skills can be extracted and categorized from the resume. Postings by the user/registrant can then be identified within a forum in step 2906, stored in a database associated with the user/registration in step 2908, and then tagged 2910 with identifiers of selected skills and/or tagged with identifiers created for the user, of new skills, associated with the user/registrant. In some embodiments, the posting can be further tagged 2910 with an identifier of a location within the user's resume or social media user profile, so that the post can be highlighted in the user's resume or profile, in a section of the resume or profile identified by the location tag.

The system can then monitor 2912 the forum(s) for activity corresponding to new posts or existing posts associated with the user/registrant and the user's/registrant's skills and detect 2914 any activity associated with the user/registrant in the forum(s) and update a user's skill accordingly 2916.

In step 2918 if the system receives a request for the user's/registrant's resume, the system can identify 2920 all posts related to the user's/registrant's skills and present the resume with the user's/registrant's skills. If in step 2920, a user selects a particular skill within a user's/registrant's resume, the associated skills can be presented in step 2922 and associated ratings can also be presented in association with those skills 2924 which can include a weighted value, such as a weighted grade, associated with such skills 2926. In some embodiments information regarding the weighted value can be presented 2928 including the relevant posts and evaluations.

Figure 30:
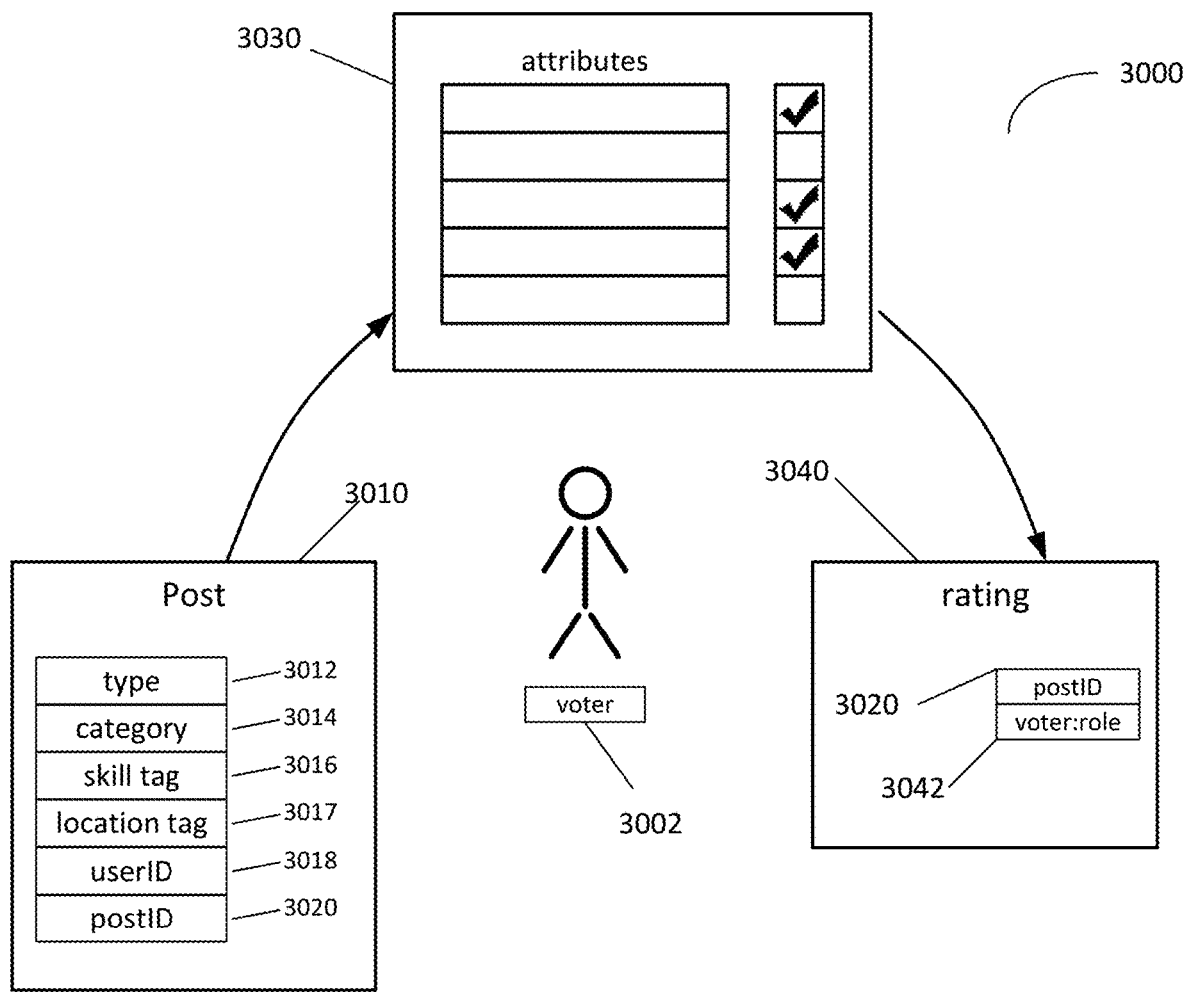
FIG. 30 depicts a block diagram of an exemplary embodiment of a system for rating for a post.

FIG. 30 depicts a block diagram of an exemplary embodiment of a system for rating for a post 3000. In the embodiment depicted in FIG. 30, the system 3000 can comprise a posting system 3010, an attributes linking system 3030 and a rating system 3040. In operation, user/registrants can post in the posting system 3010 and the posting can be categorized to include a type of posting 3012, a category of posting 3014, a skill tag 3016, a location tag 3017, a user ID 3018 and a posting ID 3020, such that a posting can be associated with a user's/registrant's resume and the particular skills associated with that user's/registrant's resume. In some embodiments, the posting can be tagged 3017 with an identifier of a location within the user's resume or social media user profile, so that the post can be highlighted in the user's resume or profile, in a section of the resume or profile identified by the location tag. Another user such as voter 3002 can then evaluate the posting. Attributes 3030 of the posting and the voter 3002 can then be compared to determine a weight that should be associated with a voter's grading or rating. Additionally, the posting ID 3020 and the voter's role connection with the (posting) user can be recorded in the rating system 3040. By way of non-limiting example, if the user posts in the forum an article about electrical fields, and the voter were a professor of electrical engineering, there would be a high degree of correlation between the subject of the posting and the voter's expertise and thus the weighting of the voter's evaluation would be high. However, if the voter were known solely as a professor of French literature, then there would be little correlation between the subject of the posting and the voter's expertise and thus the weighting of the voter's evaluation would be low. Similarly, in some embodiments, the evaluation of a user's/registrant's post by a former employer of the user/registrant can be assigned a specific weight. As previously noted, other systems related to the degree of correlation of a voter's vote with some metric of previous votes can also be used to evaluate and weight the voter's vote.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

With regards to FIGS. 1-15 and 17-30, steps attributed to a computer can be accomplished by a variety of software and/or hardware elements of a computer. In some embodiments, a specific step or portion of a step can be described as performed by a specific element, such as an application. Although some specific embodiments may be as so described, the available embodiments disclosed herein are generally not so limited. For example, it can be appreciated that corresponding to a specific step, accomplishing a specific operation and/or set of operations can be attributed to specific applications, libraries, operating system functions, and/or other elements of computer 1600 in a variety of ways.

Further, in some embodiments, a specific operation and/or set of operations corresponding to a specific step can be accomplished by a combination of operations of elements of computer 1600.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method comprising the steps of:
incorporating one or more modules into an online ecommerce platform to improve a capability of the online ecommerce platform to provide item verifications and grades corresponding to a ratable structure, the ratable structure stored in database storage of a database of the online ecommerce platform, the one or more modules configuring one or more computer processors of the online ecommerce platform to perform operations, the operations comprising:
instantiating the ratable structure corresponding to a first user in the database storage;
notating, in the ratable structure, records of one or more specified items corresponding to the first user;
storing a message in the database storage as a first evaluation corresponding to the first user, wherein a first online discussion area comprises an instance of the message;
attaching an item tag to the first evaluation, the item tag corresponding to the first user and a selected one of the specified items;
monitoring the first online discussion area for evaluations corresponding to the first user;
detecting an evaluation corresponding to the first user that comprises the item tag corresponding to the selected one of the specified items, and, linking the detected evaluation with the ratable structure, thus augmenting the ratable structure with a link to the detected evaluation;
receiving a query corresponding to the first user and the selected one of the specified items; and, in response to the query, presenting the ratable structure comprising the link to the detected evaluation, thereby providing at least some item verifications and grades corresponding to the ratable structure.

2. The method of claim 1, wherein:
the online ecommerce platform comprises an online resume generating service.

3. The method of claim 1, wherein:
the online ecommerce platform comprises an online marketplace.

4. The method of claim 1, wherein:
the online ecommerce platform comprises an online social media platform.

5. The method of claim 1, the operations further comprising:
instantiating a location tag corresponding to the selected one of the specified items; and,
receiving a query corresponding to the first user and the selected one of the specified items; and, in response to the query, presenting the ratable structure comprising a link to the detected evaluation, wherein the location of the link within the ratable structure is responsive to the location tag.

6. The method of claim 1, the operations further comprising:
presenting an array of possibly relevant attributes corresponding to the first evaluation; recording in the database storage a choice of none or more of the possibly relevant attributes, corresponding to a first voter and a user role corresponding to the first voter, thus providing and storing a first rating corresponding to the first evaluation, the first voter, and the user role corresponding to the first voter;
determining a weighting value associated with the selected one of the specified items, responsive to one or more of:
a count of evaluations that comprise an item tag corresponding to the first user and the selected one of the specified items,
ratings corresponding to evaluations that comprise an item tag corresponding to the first user and the selected one of the specified items,
user roles of voters who provide the ratings corresponding to evaluations that comprise an item tag corresponding to the first user and the selected one of the specified items, and,
ratings profiles of the voters who provide ratings corresponding to evaluations that comprise an item tag corresponding to the first user and the selected one of the specified items; and,
in response to the query, providing an indication of the weighting value associated with the selected one of the specified items, thereby providing item verifications and grades corresponding to the ratable structure.

7. The method of claim 6 wherein:
the first evaluation is categorized as corresponding to a specified type of one or more types, and,
elements of the array of possibly relevant attributes are at least in part presented responsive to the specified type.

8. The method of claim 7, wherein an accuracy rating is associated with the first voter and the accuracy rating of the first voter is combined with the accuracy rating of the first voter associated with the one of the specified items.

9. The method of claim 8, wherein the accuracy rating associated with the first voter is based at least in part on a comparison of votes cast by the first voter related to evaluations other than the first evaluation and votes cast by voters other than the first voter related to the evaluations other than the first evaluation.

10. The method of claim 9 wherein the accuracy rating associated with the first voter is increased based on a degree of agreement between votes cast by the first voter related to evaluations other than the first evaluation and votes cast by voters other than the first voter related to the evaluations other than the first evaluations.

11. The method of claim 10 wherein the accuracy rating associated with the first voter is decreased based on a degree of divergence between votes cast by the first voter related to evaluations other than the first evaluation and votes cast by voters other than the first voter related to the evaluations other than the first evaluation.

12. The method of claim 6, wherein an accuracy rating associated with the first voter is based at least in part on a comparison of votes cast by the first voter related to evaluations other than the first evaluation and votes cast by voters other than the first voter related to the evaluations other than the first evaluation.

13. The method of claim 12 wherein the accuracy rating associated with the first voter is increased based on a degree of agreement between votes cast by the first voter related to evaluations other than the first evaluation and votes cast by voters other than the first voter related to the evaluations other than the first evaluation.

14. The method of claim 13 wherein the accuracy rating associated with the first voter is decreased based on a degree of divergence between votes cast by the first voter related to evaluations other than the first evaluation and votes cast by voters other than the first voter related to the evaluations other than the first evaluation.

15. A system comprising one or more computer processors, memory, and a database, the system configured to perform operations comprising:
instantiating in memory a ratable structure corresponding to a first user;
identifying a portion of said ratable structure having at least one predefined item contained within said ratable structure;
instantiating discussion areas in a database;
identifying an evaluation corresponding to said first user in said database;
associating said evaluation with said at least one predefined item; and
associating said evaluation with said portion of said ratable structure having at least one predefined item, such that a viewer of said ratable structure can access said evaluation from said instantiated ratable structure.

16. The system of claim 15 further comprising:
monitoring said discussion areas for additional evaluations corresponding to said first user;
detecting said additional evaluations corresponding to said first user;
identifying said one or more items within said additional evaluations; and
associating said additional evaluations corresponding to said one or more items with those portions of said ratable structure of said first user associated with said one or more items.

17. The system of claim 16 further comprising:
receiving a query corresponding to one of said first user and said one or more predefined items; and
in response to said query, presenting said ratable structure of said first user.

18. The system of claim 17 further comprising:
instantiating a location tag corresponding to one of the one or more predefined items;
in response to said query, presenting said ratable structure of said one of the one or more predefined items; and,
wherein the location of the one of the one or more predefined items within the ratable structure is responsive to the location tag.

19. The system of claim 17, wherein voters can provide ratings of said evaluation.

20. The system of claim 19, wherein a voter can have a weighting value.

21. The system of claim 20, wherein said voter provides a rating of said evaluation, and said weighting value of said voter is determined based at least in part on the voter's degree of agreement with other voters regarding said rating of said evaluation.

22. The system of claim 21, wherein said weighting value of said voter is increased based upon a degree of agreement of said voter with other voters regarding said rating of said evaluation and other evaluations contained within said discussion area.

23. The system of claim 21, wherein said weighting value of said voter is decreased based upon a degree of divergence of said voter's ratings from other voters in other evaluations contained within said discussion area.

24. The system of claim 21, wherein said weighting value of said voter can be fixed.

\* \* \* \* \*